(12) United States Patent
Arkhangorodsky et al.

(10) Patent No.: US 11,341,149 B2
(45) Date of Patent: May 24, 2022

(54) SYSTEMS AND METHODS FOR BITMAP FILTERING WHEN PERFORMING FUNNEL QUERIES

(71) Applicant: SHOPIFY INC., Ottawa (CA)

(72) Inventors: Mikhal Arkhangorodsky, Toronto (CA); Mohammad Zeeshan Qureshi, Toronto (CA)

(73) Assignee: SHOPIFY INC., Ottawa (CA)

( * ) Notice: Subject to any disclaimer, the term of this patent is extended or adjusted under 35 U.S.C. 154(b) by 442 days.

(21) Appl. No.: 16/448,394

(22) Filed: Jun. 21, 2019

(65) Prior Publication Data
US 2020/0401589 A1    Dec. 24, 2020

(51) Int. Cl.
*G06F 16/2458* (2019.01)
*G06F 16/22* (2019.01)

(52) U.S. Cl.
CPC ...... *G06F 16/2474* (2019.01); *G06F 16/2237* (2019.01)

(58) Field of Classification Search
CPC .......................... G06F 16/2474; G06F 16/2237
USPC ....................................................... 707/754
See application file for complete search history.

(56) References Cited

U.S. PATENT DOCUMENTS

| | | | | |
|---|---|---|---|---|
| 6,754,388 B1 * | 6/2004 | Foslien | ............... | G06F 16/2465 382/209 |
| 8,442,863 B2 * | 5/2013 | Chandramouli | .. | G06F 16/24568 705/14.43 |
| 9,552,334 B1 * | 1/2017 | Meisels | ................. | G06F 40/295 |
| 2002/0116417 A1 | 8/2002 | Weinberg et al. | | |
| 2009/0172014 A1 * | 7/2009 | Huetter | ............... | G06F 16/2477 |
| 2009/0300009 A1 * | 12/2009 | Rezaei | ............... | G06Q 30/0256 707/999.005 |
| 2010/0169322 A1 * | 7/2010 | Selvaraj | ................ | G06F 12/023 707/E17.051 |
| 2013/0060639 A1 * | 3/2013 | Gadhia | .............. | G06Q 30/0251 705/14.58 |
| 2015/0127649 A1 | 5/2015 | Felch | | |
| 2017/0041296 A1 | 2/2017 | Ford et al. | | |
| 2017/0316007 A1 * | 11/2017 | Vandenberg | ........ | G06F 16/2462 |
| 2018/0032574 A1 * | 2/2018 | Vandenberg | .......... | G06F 16/248 |
| 2019/0220487 A1 | 7/2019 | Denninghoff | | |

(Continued)

OTHER PUBLICATIONS

"Maximizing Process Performance with Maze, Uber's Funnel Visualization Platform;" Yujua Luo and Jerome Cukier; Aug. 16, 2018; taken from: https://eng.uber.com/maze/; last accessed on Nov. 8, 2021.*

(Continued)

*Primary Examiner* — Giovanna B Colan

(57) ABSTRACT

Data may be queried and analyzed in order to draw insights. One type of data query that may be performed is a funnel query. A funnel query is a query characterized by a sequence of events, e.g.: "In the last N days, how many unique users performed event A, then event B, and then event C". Systems and methods for performing funnel queries are provided herein. In some embodiments, the speed at which a computer can answer a funnel query may be increased. In some embodiments, a bitmap is used to eliminate one or more sequences of events that would otherwise need to be traversed during the funnel query. In some embodiments, a sequence of events is stored across multiple data partitions, each data partition covering a different period of time.

20 Claims, 14 Drawing Sheets

(56) References Cited

U.S. PATENT DOCUMENTS

2020/0226214 A1 7/2020 Reddekopp et al.
2020/0401586 A1 12/2020 Arkhangorodsky et al.

OTHER PUBLICATIONS

Non-Patent Literature: "Maximizing Process Performance with Maze, Uber's Funnel Visualization Platform;" Yujua Luo and Jerome Cukier; Aug. 16, 2018; taken from: https://eng.uber.com/maze/; last accessed on Nov. 8, 2021.*
TrailDB Website. Author unknown. Available online at http://traildb.io/. Published online at least as early as Sep. 2018 (exact earlier publication date unknown). Last accessed online in Jun. 2019. 3 pages.
Wang, Jeffrey. "Nova: The Architecture for Understanding User Behavior," published online on May 25, 2016. Available from https://amplitude.com/blog/2016/05/25/nova-architecture-understanding-user-behavior. Last accessed online in Jun. 2019. 11 pages.
Luo, Yujia and Cukier, Jerome. "Maximizing Process Performance with Maze, Uber's Funnel Visualization Platform," published online on Aug. 16, 2018. Available from https://eng.uber.com/maze/. Last accessed online in Jun. 2019. 11 pages.
Presto Website: "Distributed SQL Query Engine for Big Data". Author unknown. Available online from https://prestodb.github.io/. Published online at least as early as Aug. 2018 (exact earlier publication date not known). Last accessed online in Jun. 2019. 2 pages.

* cited by examiner

| E-Commerce Platform | Q Search | | JG John's Apparel / Jonny B. Good |

Home
Orders
◇ Products
○₊ Costumers
⊣⊢ Reports
⚙ Discounts
⊞ Apps
SALES CHANNELS ⊕
⊟ Online Store
▯ Mobile App
View all channels ⚙ Settings Good afternoon, Jonny B..
Here's what's happening with your store today.

Today's total sales    Today's visits
$98.00                 1

● Update your Platform Payments tax details
We require additional information to verify your identity.
[Update tax details]

● Advanced Cash on Delivery has been deactivated for your store
[See why]

● Pinterest has been disabled. Review its eligibility requirements to find out how to enable it again.

All channels ⌄    Today ⌄

TOTAL SALES
$98.00

$125
$75
$25
       12am    8pm    4pm    11pm
                             Jun 1
                             2 orders

TOTAL SALES BY CHANNEL    View dashboard

Online Store                          Jun 1
$0.00                              0 orders Mobile app
$0.00                              0 orders Shopify POS (126 York St.)
$0.00                              0 orders

FIG. 2

| User ID | Name | 264A | 264B | 264C | 264D | 264E | 264F |
|---------|------|------|------|------|------|------|------|
| | | | | Data Partition Sequence ID | | | |
| 0001 | Fred | 1 | 1 | - | - | - | - |
| 0010 | Jane | 2 | 2 | 2 | - | - | - |
| 0011 | Will | 3 | 3 | 3 | - | - | - |
| 0100 | Amy | 4 | - | 1 | - | - | - |
| 0101 | Kate | 5 | - | - | - | - | - |
| 0110 | Gord | - | - | - | 1 | 1 | 2 |
| 0111 | Dave | - | - | 4 | 2 | 2 | 1 |
| 1000 | Sarah | - | - | - | - | 3 | - |
| 1001 | Ted | - | - | - | - | 4 | 3 |
| 1010 | Jen | - | - | - | - | 5 | - |

| Event | Bitmap | | | | | | |
|---|---|---|---|---|---|---|---|
| Visit homepage | 1 | 1 | 0 | 1 | ... | 1 | 0 |

↑ Sequence #1      ↑ Sequence #N

| Event | Bitmap | | | | | | | |
|---|---|---|---|---|---|---|---|---|
| Visit homepage | 1 | 1 | 0 | 1 | ... | 1 | 0 | 332 |
| Navigate to calendar collection | 1 | 1 | 1 | 1 | ... | 0 | 1 | 334 |
| Visit puppy calendar page | 1 | 1 | 1 | 1 | ... | 1 | 1 | 336 |
| Visit kitten calendar page | 1 | 0 | 0 | 1 | ... | 0 | 1 | 338 |
| Perform search in search box | 0 | 0 | 0 | 0 | ... | 1 | 0 | 340 |

FIG. 9

SYSTEMS AND METHODS FOR BITMAP FILTERING WHEN PERFORMING FUNNEL QUERIES

FIELD

The present application relates to performing funnel queries, which are data queries characterized by a sequence of events.

BACKGROUND

A data storage system may store large amounts of data that may be queried and analyzed in order to draw insights. For example, in the context of e-commerce, an e-commerce platform may collect and store large amounts of data that may be queried and analyzed by merchants on the e-commerce platform.

One type of data query that may be performed is a funnel query. A funnel query is a query characterized by a sequence of events, e.g.: "In the last N days, how many unique users performed event A, then event B, and then event C". The sequence of events in the funnel query will be referred to as a "funnel". Each event in the funnel will be referred to as a "funnel event".

The following are two simple examples of funnel queries in the context of e-commerce, and that may be of interest to a merchant: (1) "In the last 30 days, how many people visited the webpage for my product Puppy Calendar, and then subsequently bought a Puppy Calendar"; (2) "In the last week, how many people visited my homepage, used the search feature on the homepage, and then visited the product page for my product Puppy Calendar".

The answer to the funnel query includes the answer to the specific question being asked in the funnel query, but may also include related information, e.g. information indicating the number of users that failed to progress past each event in the query. For example, if the funnel query were: "In the last 30 days, how many people visited the webpage for my product Puppy Calendar, and then subsequently bought a Puppy Calendar", then the answer to the funnel query may be: "In the last 30 days, 276 people visited the webpage for the product Puppy Calendar, and 23 of those 276 people subsequently bought a Puppy Calendar".

It is desired to try to improve the computer implementation of a funnel query in order to try to increase the speed at which a computer can answer a funnel query.

SUMMARY

Systems and methods for performing funnel queries are disclosed herein.

In some embodiments, systems and methods are disclosed in which a bitmap is used to eliminate one or more sequences of events that otherwise would need to be traversed during the funnel query. The funnel query may therefore possibly be executed faster.

In some embodiments, systems and methods are disclosed in which a sequence of events is stored across multiple data partitions, each data partition covering a different period of time. Each period of time may be relatively short in duration. This may allow for faster execution of a funnel query that spans a short period of time. To accommodate funnel queries that do not span a short period of time, memory may be used to track the funnel event each user is at in the funnel at the start of each time period corresponding to a data partition.

In some embodiments, the methods may be performed within an e-commerce platform. For example, data related to website visits and sale transactions may be stored for each merchant in a data storage system as part of the e-commerce platform. A merchant may then use his/her merchant device to submit funnel queries of interest. The funnel queries may be implemented in the manner described herein.

According to one embodiment, there is provided a computer-implemented method. The method may include accessing data stored in memory. The data may be stored as a plurality of sequences. Each sequence of the plurality of sequences may correspond to a respective user, and each sequence of the plurality of sequences may record a respective set of events that were performed by the respective user. The method may further include performing a query on the data to identify which users performed a series of particular events, where the series of particular events are defined by the query, and the series of particular events include a target event. Performing the query may include: obtaining information that indicates, for each sequence of the plurality of sequences, whether or not the sequence includes the target event; using the information to identify a subset of the plurality of sequences for which each sequence of the subset of the plurality of sequences includes the target event; and searching for the series of particular events in each sequence of the subset of the plurality of sequences. A system configured to perform the method is also provided.

According to another embodiment, there is provided another computer-implemented method. The method may include accessing data stored in memory. The data may be stored in a plurality of data partitions in the memory. Each data partition of the plurality of data partitions may include a respective set of sequences. Each sequence of the respective set of sequences may correspond to a respective user. Each sequence of the respective set of sequences may record a respective set of events that were performed by the respective user. The method may further include performing a query on the data to identify which ones of a plurality of users performed a series of particular events, where the series of particular events are defined by the query, and the series of particular events include a first event and a subsequent second event. Performing the query may include: searching for the series of particular events in each of at least some of the sequences in a first data partition; in response to determining that the first event is located in a particular sequence in the first data partition: determining a particular user corresponding to the particular sequence, and storing a mapping indicating that the first event was found for the particular user; searching at least some of the sequences in a second data partition, including: identifying that a given sequence in the second data partition corresponds to the particular user, accessing the mapping to determine that the first event was already found for the particular user, and beginning searching the given sequence in the second data partition for the subsequent second event. A system configured to perform the method is also provided.

BRIEF DESCRIPTION OF THE DRAWINGS

Embodiments will be described, by way of example only, with reference to the accompanying figures wherein:

FIG. 2 is an example of a home page of an administrator, according to one embodiment;

FIG. 6 illustrates an example of a user-to-sequence mapping table;

FIG. 8 illustrates an example bitmap;

FIG. 9 illustrates an example of a plurality of bitmaps, each one corresponding to a respective different event;

DETAILED DESCRIPTION

For illustrative purposes, specific example embodiments will now be explained in greater detail below in conjunction with the figures.

Example e-Commerce Platform

In some embodiments, the methods disclosed herein may be performed on or in association with an e-commerce platform. Therefore, an example of an e-commerce platform will be described.

Figure 1:
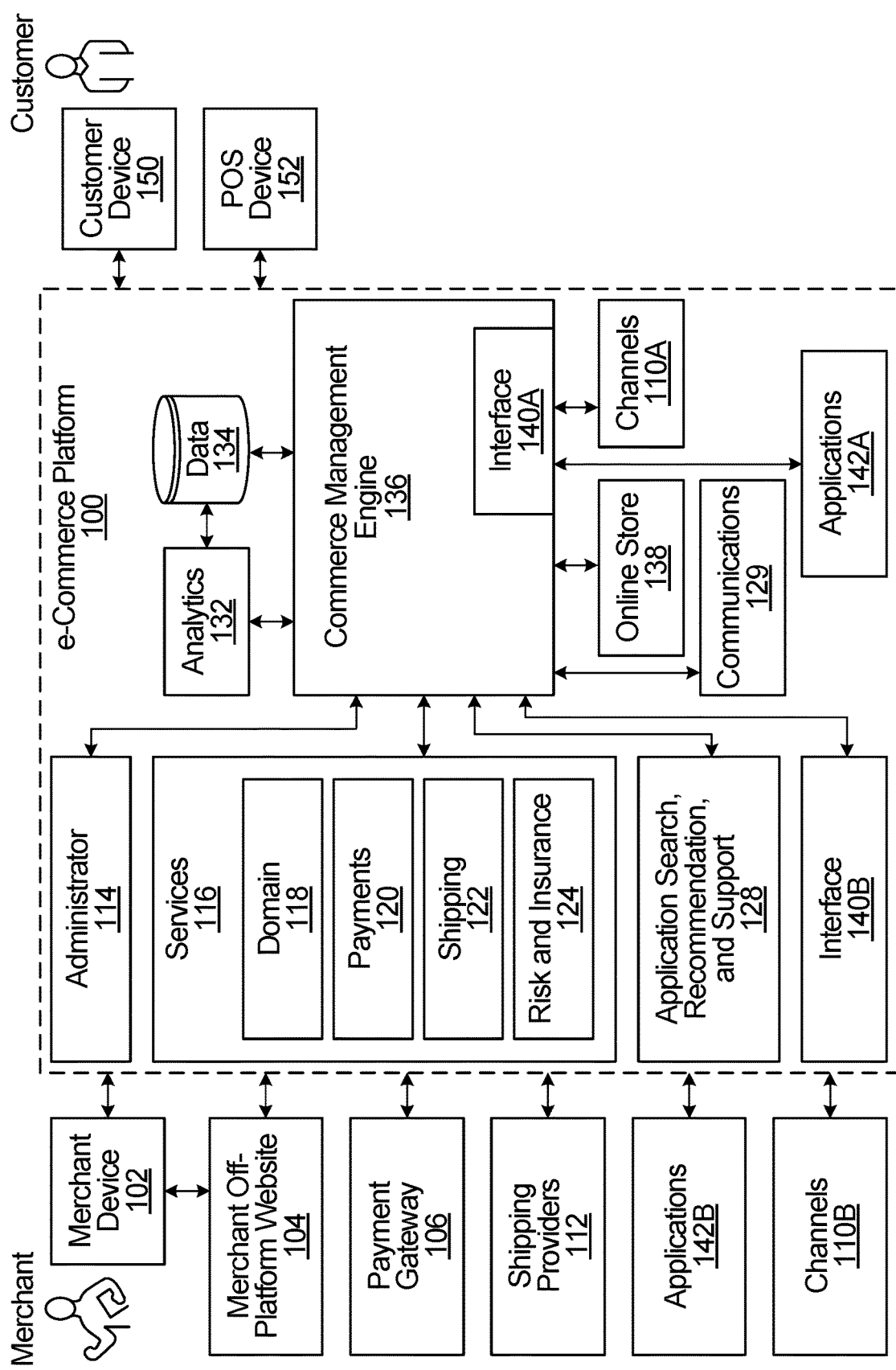
FIG. 1 is a block diagram of an e-commerce platform, according to one embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Data Collection and Analysis in the e-Commerce Platform

Figure 3:
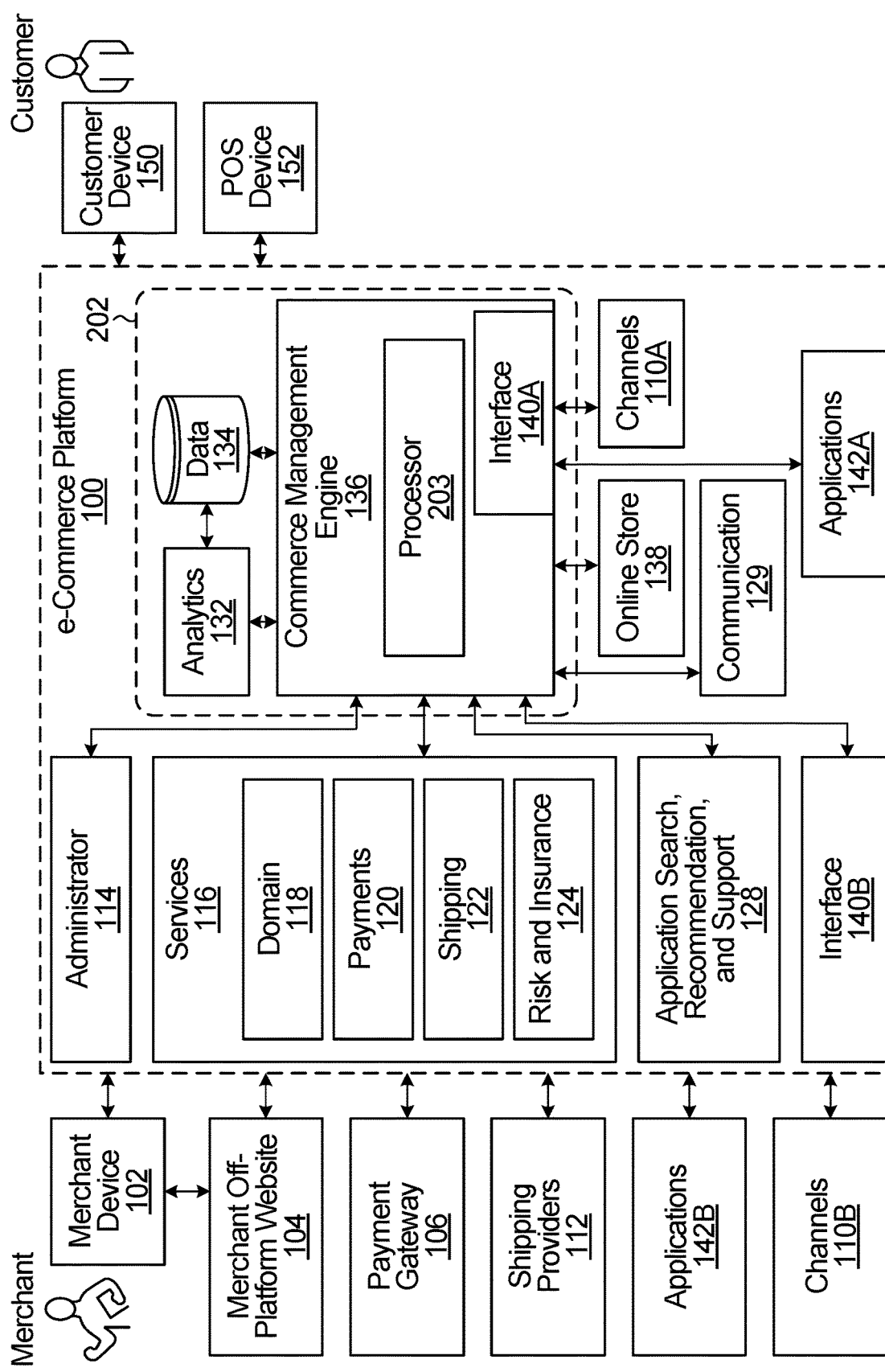
FIG. 3 is a block diagram of an e-commerce platform, according to another embodiment.

In some embodiments, data related to merchants, buyers, website visits, and transactions may be stored in a data storage system as part of the e-commerce platform 100. A merchant may use their merchant device 102 to submit funnel queries of interest. For example, FIG. 3 illustrates the e-commerce platform 100 of FIG. 1, but with a stippled box 202 encompassing the commerce management engine 136, data facility 134, and analytics 132. The data is collected by the commerce management engine 136 and stored in data facility 134. A merchant device 102 may submit a funnel query to the commerce management engine 136. A processor 203 in the commerce management engine 136 may perform the funnel query on the data in the data facility 134, e.g. to produce analytics 132. The funnel query may be implemented as described herein.

However, although the embodiments described below may be implemented in association with an e-commerce platform (e.g. e-commerce platform 100, as in FIG. 3), the embodiments described below are not limited to implementation in an e-commerce platform. Rather, most of the embodiments described below may be implemented in any system in which funnel queries are performed on data in a data storage system. The data and the funnel queries do not have to relate to e-commerce. Therefore, much of the remaining explanation will not be tied to an implementation in an e-commerce platform.

Data Storage to Facilitate Funnel Queries

Figure 4:
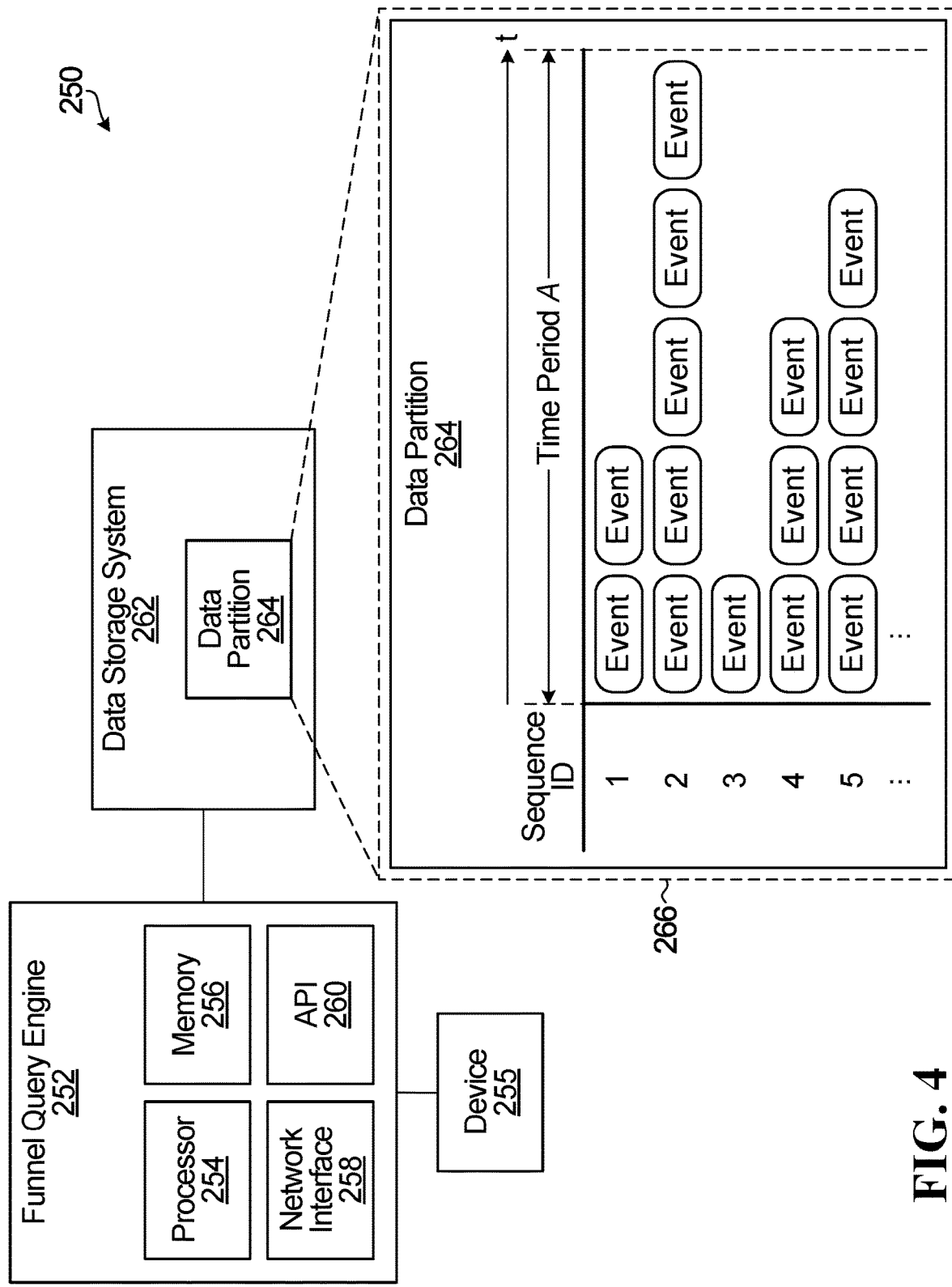
FIG. 4 illustrates a system for performing funnel queries, according to one embodiment.

FIG. 4 illustrates a system 250 for performing funnel queries, according to one embodiment. The system 250 includes a funnel query engine 252 and a data storage system 262. In some embodiments, the data storage system 262 may be or include one or more databases. In some embodiments, the data storage system 262 may be implemented as distributed data storage.

The funnel query engine 252 includes a processor 254 for performing or controlling the operations of the funnel query engine 252, and an associated memory 256. The processor 254 may be implemented by one or more processors that execute instructions stored in the memory 256. The instructions, when executed, cause the processor 254 to perform the operations of the funnel query engine 252. Alternatively, some or all of the processor 254 may be implemented using dedicated circuitry, such as an application specific integrated circuit (ASIC), a graphics processing unit (GPU), or a programmed field programmable gate array (FPGA).

The funnel query engine 252 further includes a network interface 258 for communicating over a network (not illustrated). For example, the funnel query engine 252 may use the network interface 258 to receive funnel query requests from devices over the network, e.g. from device 255. As another example, the funnel query engine 252 may use the network interface 258 to access the data stored in the data storage system 262 via the network. The structure of the network interface 258 depends on how the funnel query engine 252 interfaces with the network. Example structures include: a network interface card (NIC), and/or a computer port (e.g. a physical outlet to which a plug or cable connects), and/or a network socket, etc.

The funnel query engine 252 may further include an API 260 for receiving funnel query requests and for presenting the answer to each funnel query. The API 260 is shown as a separate component, but it may be implemented by the processor 254 and the network interface 258. For example, the structure of the API 260 may include the processor 254 and network interface 258, where the processor 254 executes instructions that cause the processor 254 to: (1) receive API calls from devices (e.g. device 255) through the network interface 258; (2) perform a funnel query requested in the API call; and (3) send the answer to the funnel query through the network interface 258.

In some embodiments, the system 250 may be implemented as part of the e-commerce platform illustrated in FIGS. 1 to 3, in which case the device 255 may be merchant device 102, the funnel query engine 252 may be part of the commerce management engine 136 (and processor 254 may be processor 203 in FIG. 3), and the data storage system 262 may be data facility 134.

The data storage system 262 includes one or more data partitions. Reference character 264 is used to refer to a single data partition. Each data partition 264 is implemented using physical memory, e.g. random-access memory (RAM), read-only memory (ROM), electrically erasable programmable read-only memory (EEPROM), flash memory, or other memory technology. Data partition 264 is illustrated in more detail in stippled bubble 266. Data partition 264 stores a plurality of different sequences. Each sequence has a respective sequence identifier (ID) that uniquely identifies the sequence. Each sequence is a stored discrete series of events performed by a same particular user during a time period. Because data partition 264 covers a finite period of time (time period A in the illustrated example), the data partition 264 may sometimes be referred to as a "time shard".

The events in the data partition are stored in a time-sequential manner. That is, for each sequence: the first event in the sequence occurs earlier than all other events in that sequence; the last event in the sequence occurs later than all other events in that sequence; and every other event in the sequence occurs later than the adjacent previous event in the sequence and earlier than the adjacent subsequent event in the sequence.

An event is a record of a discrete action that was performed by a user. In an e-commerce application, the data partition 264 may correspond to a particular merchant, and each sequence may correspond to a respective different user (e.g. customer device) that visited the merchant's online store. Examples of events could possibly include: "the user visits the merchant's home page"; "the user performs a search using the merchant's search box"; "the user visits the merchant's product page for Puppy Calendar"; "the user leaves the product page for Puppy Calendar"; "the user visits the merchant's product page for Kitten Calendar"; "the user purchases a Kitten Calendar", etc. Each example in the previous list may be its own event. An event may be stored as a set of one or more numerical values, with each numerical value having a predefined mapping to understandable actions and information. For example, the event stored as "1526|0101|1110" may map to "at 3:26 pm the user visited the Puppy Calendar product webpage of the merchant's online store". In this example mapping, "1526" maps to 3:26 pm, "0101" maps to "visited a product webpage", and "1110" maps to "product=Puppy Calendar".

In the data partition 264, each sequence corresponds to a respective unique user, e.g. a unique visitor/customer device in the context of e-commerce. Sequences may be of different lengths. A "long sequence" is a sequence that includes many events, e.g. the user corresponding to the sequence performs many different actions during time period A. A "short sequence" is a sequence that does not include many events, e.g. the user corresponding to the sequence performs only a few events during time period A.

One example way to implement data storage system 262 and data partition 264 is to use TrailDB™. In TrailDB™, each sequence is referred to as a "trail", and an event is stored as field:value pairs.

In operation, the funnel query engine 252 receives a request to perform a funnel query on data stored in the data storage system 262. The funnel query request may be received from another computing device over a network, e.g. from device 255, which may be a merchant device in an e-commerce system. Assuming the funnel query relates to actions performed during time period A, then the data from the data partition 264 is queried to provide the answer to the funnel query. The answer may be stored in memory 256 and/or transmitted to the device that requested the funnel query.

As an example, the funnel query may be "During time period A, how many unique users visited the webpage for the product Puppy Calendar, and then subsequently bought a Puppy Calendar". Each sequence in the data partition 264 may be separately searched to: (1) first determine whether the sequence includes the event "user visits webpage for Puppy Calendar", and if so (2) does the sequence include the subsequent event "user buys Puppy Calendar". A sequence including both events in the correct time-order results in a match, which may cause a counter to be incremented. After all sequences are searched, the result of the counter reports how many unique users (unique sequences) performed the funnel. In some embodiments, the answer to the funnel query may also include an indication of how many users did not progress past each event, e.g. if 276 users performed the event "user visits webpage for Puppy Calendar", but the funnel was only found in 23 sequences (i.e. 23 matches), then the answer to the funnel query may be: "During time period A, 276 people visited the webpage for the product Puppy Calendar, and 23 of those 276 people subsequently bought a Puppy Calendar".

If TrailDB™ is used to implement the data partition 264, then traversing each sequence (i.e. trail) may be performed using an EventFilter having a batch size set to one. The EventFilter is initially set to search for the first funnel event on the trail. If the first funnel event is found, then traversing the trail continues with the EventFilter updated to look for the second funnel event, and so on. The EventFilter is reset to the first funnel event between trails.

Figure 5:
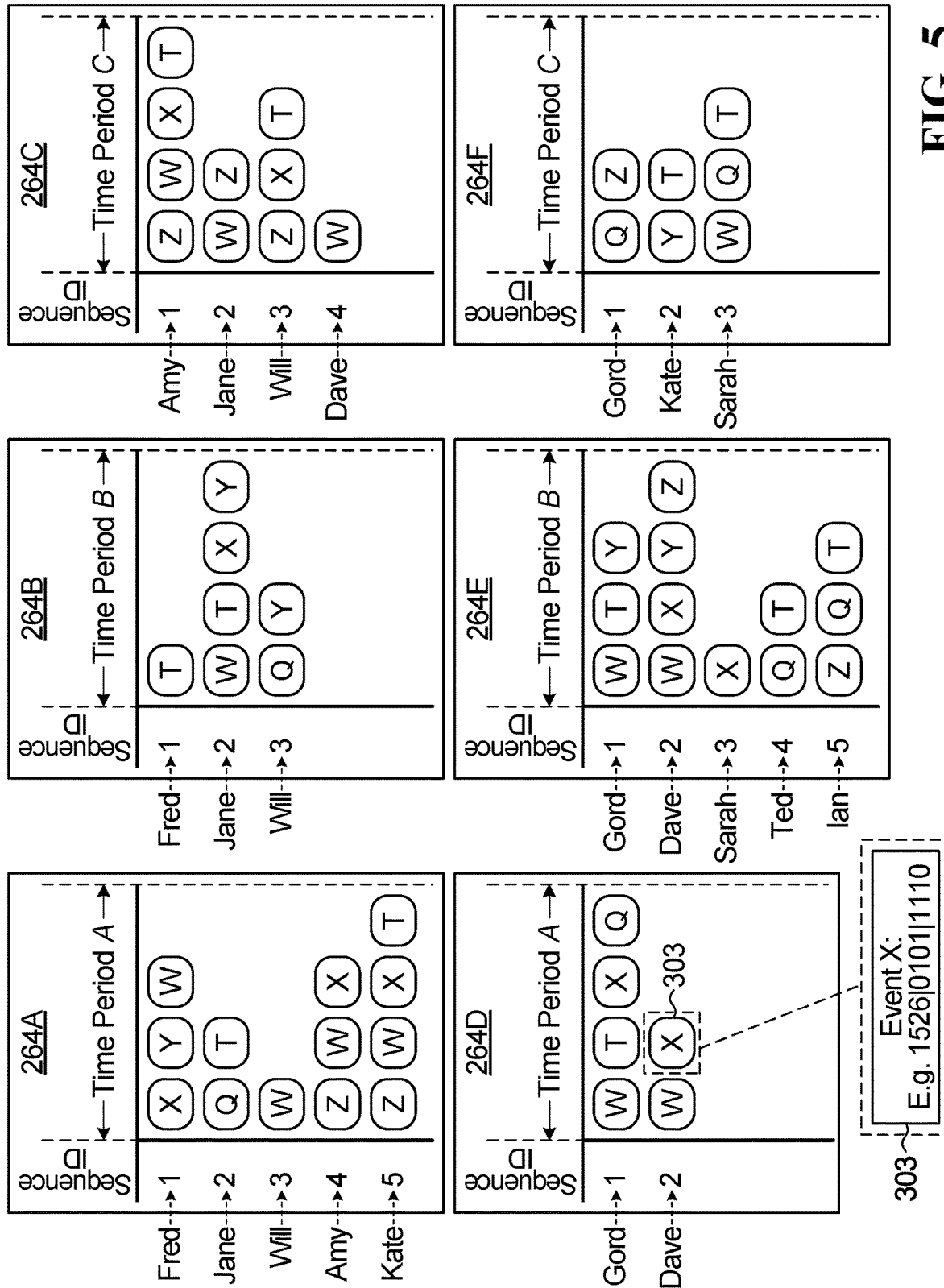
FIG. 5 illustrates an example of six different data partitions stored for a particular merchant.

In some embodiments, the data storage system 262 stores multiple data partitions, each covering a respective different time period and/or a respective different set of users. For example, FIG. 5 illustrates six different data partitions 264A-264F stored for a particular merchant. Three adjacent time periods are covered: time period A, time period B, and time period C. For example, time period A may be from 12:00 am to 11:59 pm on May 1, 2019, time period B may be from 12:00 am to 11:59 pm on May 2, 2019, and time period C may be from 12:00 am to 11:59 pm on May 3, 2019. In general, each time period may be of a different length.

Each one of the data partitions 264A-264F stores a different set of sequences. Each sequence in a data partition includes a unique sequence ID and an associated stored sequence of events. Each event is illustrated using a box with rounded edges in FIG. 5, e.g. box 303 is one event. For compactness, a letter is used to represent an event in FIG. 5, e.g. letter X represents one event (e.g. X—"user visits the Puppy Calendar product webpage"), letter Y represents another event (e.g. Y="user visits the Kitten Calendar product webpage"), etc. An event actually comprises a stored record of one or more values, e.g. event X at 303 stores "1526|0101|1110".

The sequences in one data partition do not overlap with the sequences in any other data partition. For example, data partition 264A stores five different sequences, each one having a respective sequence ID and each one storing the events performed by a respective user during time period A. Data partition 264D stores two different sequences, each one also having a respective sequence ID and each one also storing the events performed by a respective user during time period A. However, the sequences in data partition 264A are different from the sequences in data partition 264D. In particular, in time period A there were seven unique users, each one performing a respective sequence of events. Five of the users have their sequences stored in data partition 264A, and the other two users have their sequence stored in data partition 264D. In time period B there were eight unique users, each one performing a respective sequence of events. Three of the users have their sequence stored in data partition 264B, and the other five users have their sequence stored in data partition 264E. In time period C there were seven unique users, each one performing a respective sequence of events. Four of the users have their sequence stored in data partition 264C, and the other three users have their sequence stored in data partition 264F.

In general, a user may be mapped to different sequence IDs across different partitions. An example mapping between users and sequence IDs is illustrated in FIG. 5. For example, during time period A, user Dave performs the sequence of events stored as sequence ID #2 in data partition 264D. During time period B, user Dave performs the sequence of events stored as sequence ID #2 in data partition 264E. During time period C, user Dave performs the sequence of events stored as sequence ID #4 in data partition 264C. As another example, during time period A, user Fred performs the sequence of events stored as sequence ID #1 in data partition 264A. During time period B, user Fred performs the sequence of events stored as sequence ID #1 in data partition 264B. During time period C, user Fred does not perform any events and so has no corresponding sequence stored in data partition 264C or data partition 264F. Depending upon the implementation, there may be some restrictions on the partitions and/or sequences to which a user may be mapped. For example, FIG. 5 illustrates that user Dave is mapped to partitions 264D, 264E, and 264C. However, in an alternative embodiment, it may be required that a user be confined to the same horizontal row of partitions, e.g. user Dave is mapped to partition 264D and therefore can also only be mapped to partitions 264E and 264F (not partition 264B or 264C). The sequence ID to which user Dave is mapped may still change between partitions 264D, 264E, and 264F.

In general, a series of consecutive adjacent events performed by a single user may be partitioned into a plurality of disjoint data partitions that are adjacent in time. For example, user Fred performs a progression of events that are partitioned into two disjoint data partitions: data partition 264A, which covers the events falling within time period A; and data partition 264B, which covers the event falling within adjacent time period B.

Mappings may be stored that collectively map each user to a respective sequence ID in each data partition. The mappings may be stored as a table, e.g. a look-up-table (LUT). FIG. 6 illustrates an example of a user-to-sequence mapping LUT 305 corresponding to the mappings presented in FIG. 5. For example, user Jane is assigned user ID 0010, and user Jane's events are stored as sequence ID #2 in each of data partitions 264A, 264B, and 264C. The table in FIG. 6 may be stored in the data storage system 262 and/or in the memory 256 of the funnel query engine 252. In some embodiments, the user ID may be hashed. Note that LUT 305 is only an example. The mappings shown in LUT 305 may be captured in memory in another manner instead.

By having multiple distinct and disjoint data partitions, e.g. data partitions 264A-F, then parallel processing may be more easily facilitated. For example, the funnel query engine 252 may perform, in parallel, both the funnel query on data partition 264A and the funnel query on data partition 264D, and then aggregate (e.g. sum) the results. As an example, assume that the funnel query is "During time period A, how many unique users visited the webpage for the product Puppy Calendar, and then subsequently bought a Puppy Calendar". The funnel query is performed on data partition 264A and two matches are returned: sequence ID #1 (Fred), and sequence ID #5 (Kate). In parallel, the funnel query is performed on data partition 264D and one match is returned: sequence ID #1 (Gord). The result is then summed: two matches from data partition 264A, plus one match from data partition 264D, equals three matches in total. That is, during time period A, three unique users visited the webpage for the product Puppy Calendar, and then subsequently bought a Puppy Calendar.

Returning to FIG. 4, in a variation the funnel query engine 252 and the data storage system 262 may be the same entity, e.g. both implemented on a same server, possibly by a same processor and possibly using a same single allocation of memory. The memory 256 may be the same memory in which the data partitions (e.g. data partitions 264A-F) are stored.

Sequence Filtering Using a Bitmap

In some embodiments, a funnel query is performed by traversing each and every sequence stored in a data partition during the relevant time period in order to determine which sequences in that data partition include the funnel. For example, assume for ease of explanation that there is a single data partition 264 storing all of the sequences during a time period A, e.g. as in data partition 264 in FIG. 4. A funnel query is received relating to time period A. To perform the funnel query, each sequence in data partition 264 is traversed to determine whether the sequence includes the funnel, and if a sequence includes the funnel then a counter may be incremented. After all sequences in the data partition 264 are traversed, the result of the counter reports how many unique users (unique sequences) performed the funnel. The number of users that did not progress past each event may also be counted, e.g. 12,678 users performed the first event in the funnel, 125 of those users subsequently performed the second event in the funnel, and 13 of those users subsequently performed the final event in the funnel.

Figure 7:
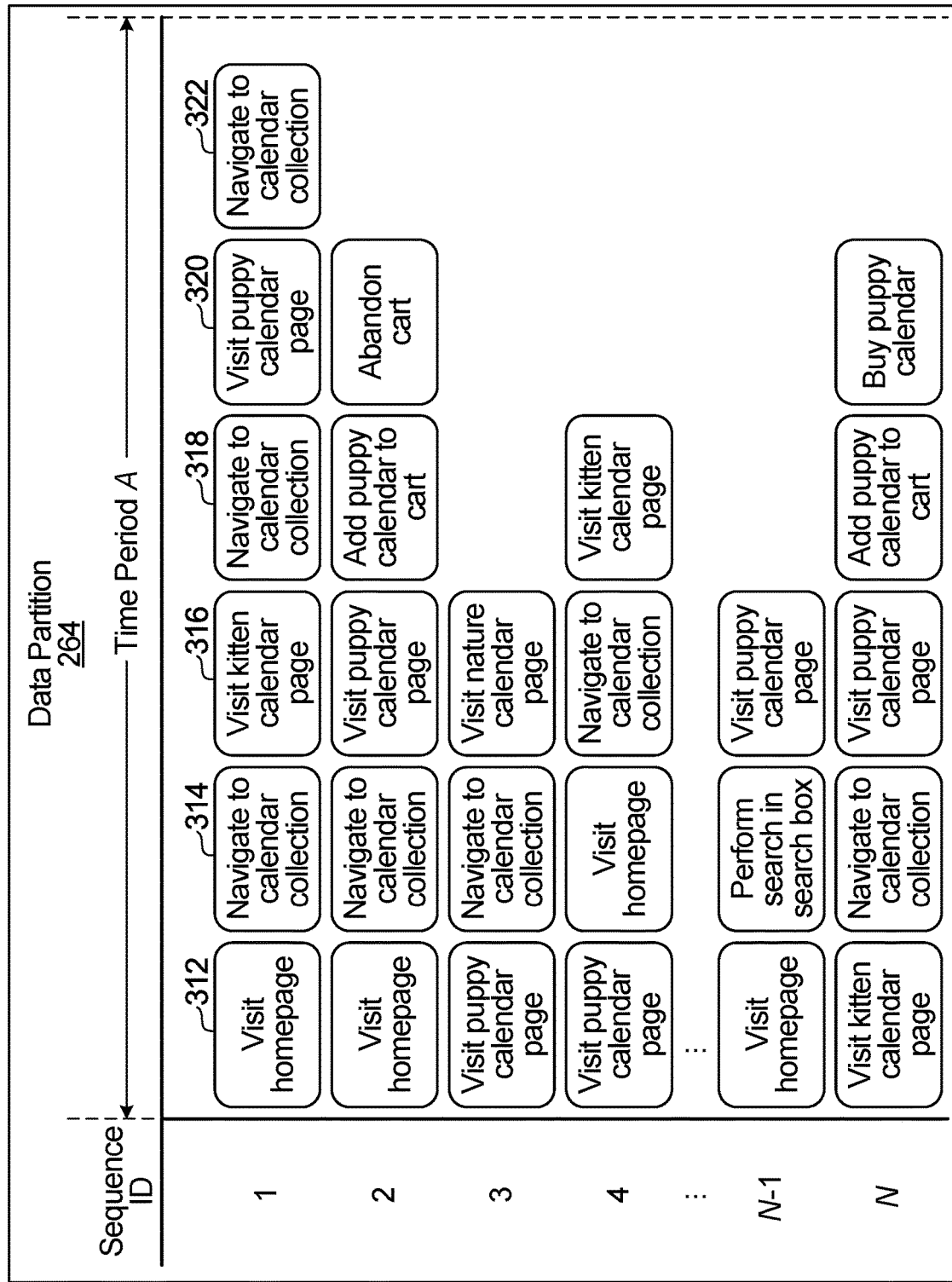
FIG. 7 illustrates an example set of sequences for a particular data partition for a particular time period.

FIG. 7 illustrates an example set of sequences for a particular data partition 264 for a particular time period A. There are N different sequences, and each sequence stores a sequence of events. In implementation, each event may be stored as one or more numerical values corresponding to a description of the event, e.g. like at 303 in FIG. 5. However, for ease of explanation, in FIG. 7 the description of the event itself is what is illustrated for each event. The user corresponding to sequence #1 performed the following time-ordered sequence of events: "visited the merchant's homepage" (event 312), then "navigated to the calendar collection webpage" (event 314), then "visited the webpage for the Kitten Calendar product" (event 316), then "navigated to the calendar collection webpage" (event 318), then "visited the webpage for the Puppy Calendar product" (event 320), and then "navigated to the calendar collection webpage" (event 320). Sequences #2 to #N each store the sequence of events performed by a respective different unique user during time period A.

Assume that the following funnel query is to be performed: "During time period A, how many unique users visited the merchant's homepage, then navigated to the calendar collection, and then visited the webpage for the product Puppy Calendar". To answer the funnel query, each one of the N sequences in FIG. 7 is searched to determine whether or not the sequence includes the funnel. Sequence #1 is first searched and returns a match: the user corresponding to sequence #1 visited the merchant's homepage (event 312), then subsequently navigated to the calendar collection (event 314), and then subsequently visited the webpage for the product Puppy Calendar (event 320). The funnel is present in sequence #1. Sequence #2 is next searched and also returns a match because the funnel is also present in sequence #2. Sequence #3 is next searched and does not return a match because the funnel is not present in sequence #3. Sequence #4 is next searched and also does not return a match. Although all of the events are present in sequence #4, the time order is not correct because in sequence #4 the user visits the webpage for the product Puppy Calendar first (e.g. maybe the user landed directly on the Puppy Calendar product page via a Facebook™ Ad). However, searching sequence #4 may result in a counter being incremented that tracks how many users performed just the first two events in the sequence because the user in sequence #4 visits the merchant's homepage and then subsequently navigates to the calendar collection. Searching for the funnel in each sequence continues until all N sequences have been searched.

In some embodiments, searching for a funnel in a sequence is performed by traversing the sequence event-by-event, starting at the first event of the sequence and continuing until the funnel condition has been satisfied or the last event in the sequence has been reached, whichever happens first. Traversing the sequence begins at the first event and proceeds event-by-event in a time order. If/when the first funnel event is located, then the traversing continues, next looking for the second funnel event. If/when the second funnel event is located, then the traversing continues, next looking for the third funnel event, and so on, until the last funnel event is located (a match) or the sequence ends.

Traversing each and every one of the N sequences to determine which sequences include the funnel may be computationally intensive, which may impact the ability of the funnel query engine 252 to run the funnel query in real-time or near real-time. Therefore, in some embodiments, information such as a bitmap is used to eliminate one or more sequences in order to reduce the number of sequences that need to be traversed during the funnel query. The bitmap may be generated prior to receiving a request to perform a funnel query, e.g. the bitmap may be generated offline. Then, when a request to perform a funnel query is received and the funnel query is performed, the bitmap may be used to try to eliminate certain sequences and thereby eliminate the need to traverse those sequences during the funnel query.

For example, FIG. 8 illustrates a bitmap 332 corresponding to the event "user visits merchant's homepage". The bitmap 332 is generated by searching (e.g. traversing) each one of the N sequences in FIG. 7 to determine whether or not the sequence includes the event "user visits merchant's homepage". If the sequence includes the event, then the bitmap value corresponding that sequence is set to '1'. Otherwise, if the sequence does not include the event, then the bitmap value corresponding to that sequence is set to '0'. The mapping between bit position and sequence ID may be preconfigured. For example, the most significant bit (MSB) in the bitmap 332 may correspond to sequence #1, with each subsequent bit in the bitmap 332 corresponding to the next sequence number, and with the least significant bit (LSB) corresponding to sequence #N. The bitmap 332 may therefore be N bits, each bit corresponding to a respective different one of the N sequences. Although computational resources are required in order to generate the bitmap 332, the bitmap 332 need not be generated in real-time, e.g. it may be generated offline. Also, once the bitmap 332 is generated, it may be used by multiple subsequent funnel queries.

The bitmap 332 may be stored in data storage system 262 (e.g. separate from the data partition 264) and/or in memory 256 of the funnel query engine 252. The memory footprint of the bitmap 332 is relatively small because the bitmap itself is only N bits.

Assume again that the following funnel query is to be performed: "During time period A, how many unique users visited the merchant's homepage, then navigated to the calendar collection, and then visited the webpage for the product Puppy Calendar". If a sequence in data partition 264 of FIG. 7 does not include the event "user visits merchant's homepage", then that sequence cannot include the funnel and therefore that sequence does not even have to be traversed. Therefore, the funnel query engine 252 first consults the bitmap 332 of FIG. 8 to determine which sequences have a bit value equal to '1', i.e. which sequences include the event "user visits merchant's homepage". Then, only the sequences that include the event are actually traversed to determine which ones of those sequences include the funnel.

In some embodiments, multiple bitmaps may be stored, each one corresponding to a respective different event. For every event that is in a funnel query and that has a bitmap, the bitmap may be used to eliminate sequences that do not include the event.

In some embodiments, every event in the data partition 262 has a corresponding bitmap. When a funnel query is received, the set of bitmaps corresponding to the set of events in the funnel query may be used to identify the subset of sequences in the data partition 262 that include all funnel events. Once the subset of sequences is identified, then only the sequences in the subset of sequences need to be traversed in order to determine which of those sequences satisfy the time-sequential property of the funnel.

For example, FIG. 9 illustrates a plurality of bitmaps, each one corresponding to a respective different event. Bitmap 332 corresponds to the event "user visits merchant's homepage". Bitmap 334 corresponds to the event "user navigates to calendar collection". Bitmap 336 corresponds to the event "user visits the webpage for the Puppy Calendar product". Bitmap 338 corresponds to the event "user visits the webpage for the Kitten Calendar product". Bitmap 340 corresponds to the event "user performs a search using the search box on the merchant's online store". In the particular example in FIG. 9, there is not a bitmap corresponding to every event in the data partition 264 of FIG. 7, only some of the events.

Assume again that the following funnel query is to be performed: "During time period A, how many unique users visited the merchant's homepage, then navigated to the calendar collection, and then visited the webpage for the product Puppy Calendar". The three funnel events in the funnel each have a respective bitmap. Specifically, the first funnel event corresponds to bitmap 332, the second funnel event corresponds to bitmap 334, and the third funnel event corresponds to bitmap 336. Bitmaps 332, 334, and 336 are therefore used by the funnel query engine 252 to eliminate the sequences that do not include all three funnel events. For example, bitmaps 332, 334, and 336 may be combined to form a single resulting bitmap having N bits, where each bit position of the resulting bitmap stores the binary result of multiplying together the bits of bitmaps 332, 334, and 336 at that position. For example, for each bit position an AND gate may be used having three inputs, each input corresponding to the bit value of a respective different one of bitmaps 332, 334, and 336 at that bit position. If a zero is present in a bit position of any one of bitmaps 332, 334, and 336, then the resulting bitmap will also have a zero in that bit position. Any sequence having a '1' in the resulting bitmap means that that sequence includes all three events. Therefore, only the sequences having a '1' in the resulting bitmap are traversed in order to determine which of those sequences satisfy the time-sequential property of the funnel. For example, sequence #4 in FIG. 7 includes all the funnel events, but the funnel is not present in sequence #4 because the events are not in the right order. Traversing sequence #4 reveals that sequence #4 does not include the funnel.

Note that using one or more bitmaps to reduce the number of sequences that need to be traversed may preclude the possibility of the funnel query returning how many users did not progress past each event in the funnel. For example, in the example described immediately above, bitmaps 332, 334, and 336 are combined to eliminate any sequences that do not include all three events "visited the merchant's homepage" and "navigated to the calendar collection" and "visited the webpage for the product Puppy Calendar". Sequence #N−1 is therefore not traversed because it does not include the second funnel event "navigated to the calendar collection". However, traversing sequence #N−1 may reveal useful information: that the user visited the merchant's homepage but then never subsequently navigated to the calendar collection. In some embodiments, to allow for the funnel query to also count how many users failed to progress past each event in the funnel, only the bitmap corresponding to the entry event in the funnel (i.e. the first event in the funnel) is used to eliminate sequences. If a sequence does not even include the entry event, then there is no benefit in traversing that sequence. In other embodiments, to allow for the funnel query to also count how many users failed to progress past each event in the funnel, the bitmaps corresponding to the events in the funnel (e.g. bitmaps 332, 334, and 336 in the example above) are OR'd together on a bit-by-bit basis to generate a resulting bitmap that only eliminates sequences that do not include any of the events. However, OR-ing together bitmaps may be less efficient than simply using the bitmap corresponding to the entry event in the funnel (i.e. the first event in the funnel).

In some embodiments, it may be undesirable or impractical to generate and store a bitmap for every possible event, e.g. if there are a large number of unique events. Therefore, in some embodiments the funnel query engine 252 only generates a bitmap for one or some events. As one example, the funnel query engine 252 may only generate a bitmap for rare events, and/or for events that appear to be common in funnel queries. For example, a bitmap may be generated for any event that appears to be a common "entry point" (i.e. first funnel event) in a funnel query. Over time, funnel queries may be monitored by the funnel query engine 252 to identify common entry points or other common events. Once a common entry point or other common event is identified, then a bitmap may be constructed for that event and used by subsequent funnel queries. For example, the funnel query engine 252 may track funnel queries over time and identify that it is common for the entry point of a funnel (i.e. the first funnel event) to be "user visits merchant's homepage". Bitmap 332 may therefore be generated by the funnel query engine 252 and used for subsequent funnel queries in which the entry point of the funnel is "user visits merchant's homepage".

An event may be identified as "common" by the funnel query engine 252 if the number or percentage of funnel queries including that event exceeds a predetermined threshold over a predefined window. The window may be measured in terms of time or in terms of number of funnel queries. An event having a corresponding bitmap may no longer be identified as "common" and have its corresponding bitmap deleted from memory if the number or percentage of funnel queries including that event drops below a predetermined threshold over a predefined window. For example, the funnel query engine 252 may keep a running record of events present in the previous one hundred funnel queries. As soon as the same entry event occurs more than fifteen times in the previous one hundred queries, then a bitmap is generated for that entry event and used for subsequent funnel queries having that entry event. Subsequently, once that entry event occurs less than five times in the previous one hundred funnel queries, then the bitmap is deleted from memory.

Finally, although the bitmap filtering is described above in the context of a funnel query such as "During time period A, how many unique users performed X, then Y, then Z", the bitmap filtering also has applicability to other types of data queries performed over multiple sequences of events. For example, assume the data query is instead: During time period A, what is the most common series of events that begin with the event "Navigate to calendar collection" and end with the event "Add Puppy Calendar to cart"? Bitmaps may be used to eliminate the need to search any sequences that do not include both events. For example, if each event had a respective bitmap, then the two bitmaps may be AND'd together to generate a resulting bitmap that only identifies sequences having both events. The sequences that include both events can then be traversed to record each series of events that start with "Navigate to calendar collection" and end with "Add Puppy Calendar to cart", and to track the most common series. For example, the results may reveal that the most common series of events is "Navigate to calendar collection" then "Visit Kitten Calendar product webpage" then "Visit Puppy Calendar product webpage" (which may have a link from the Kitten Calendar product webpage), and then "Add Puppy Calendar to cart". As another example, the data query may be "During time period A, how many users performed events X and Y", in which case the bitmap filters may be used to provide the answer without even having to traverse a sequence, if there is a bitmap for event X and a bitmap for event Y.

Figure 10:
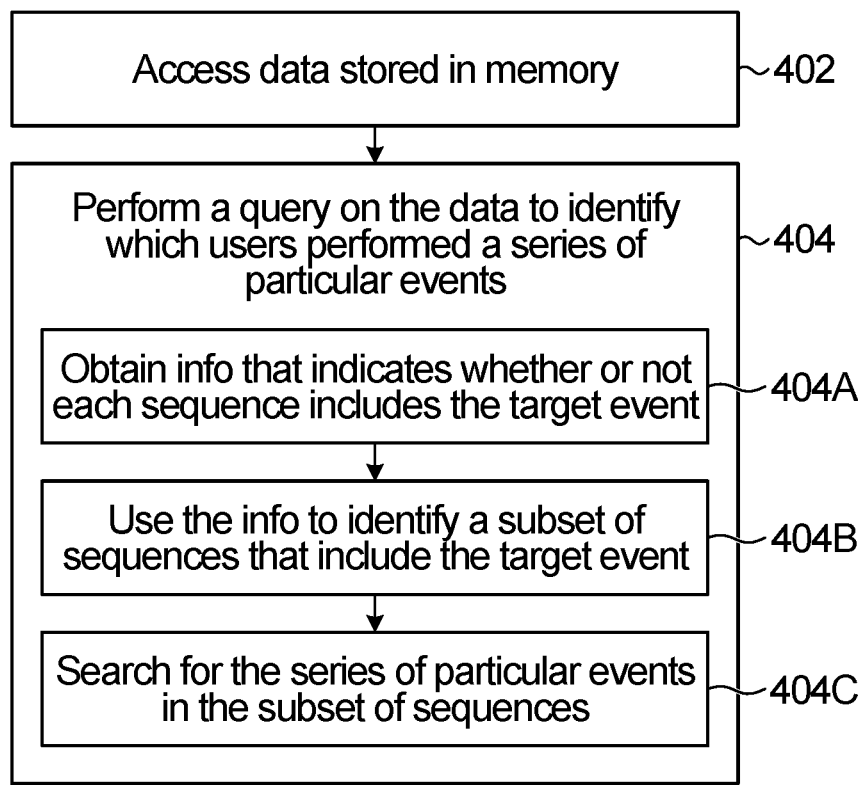
FIG. 10 illustrates a computer-implemented method, according to one embodiment.

FIG. 10 illustrates a computer-implemented method, according to one embodiment. The method may be performed by a computing device, e.g. a processor such as processor 254 of funnel query engine 252.

At step 402, the processor accesses data stored in memory, e.g. in the memory of the data storage system 262. The data is stored as a plurality of sequences. Each sequence of the plurality of sequences corresponds to a respective user, and each sequence of the plurality of sequences records a respective set of events that were performed by the respective user. An example is the data stored in data partition 264 in FIG. 4.

At step 404, the processor performs a query on the data to identify which users performed a series of particular events. The query may be a funnel query. The series of particular events are defined by the query, and the series of particular events include a target event. For example, the series of particular events may be: "visited the merchant's homepage, then navigated to the calendar collection, and then visited the webpage for the product Puppy Calendar", in which case there are three events in the series of particular events (the event "visited the merchant's homepage", the event "navigated to the calendar collection", and the event "visited the webpage for the product Puppy Calendar"). The target event may be the first event in the particular series of events: "visited the merchant's homepage".

Step 404 may include the following substeps, which are operations performed as part of the query.

At substep 404A, the processor obtains information that indicates, for each sequence of the plurality of sequences, whether or not the sequence includes the target event. An example of such information is bitmap 332 of FIG. 8.

At substep 404B, the processor uses the information to identify a subset of the plurality of sequences for which each sequence of the subset of the plurality of sequences includes the target event. An example is bitmap 332 of FIG. 8 in which the presence of a '1' in the bitmap indicates a sequence that includes the target event. The sequences that each have a '1' in the bitmap 332 form the subset of the plurality of sequences.

At substep 404C, the processor searches for the series of particular events in each sequence of the subset of the plurality of sequences. The processor may only search the subset of sequences and not the other sequences. For example, only the sequences having a '1' in the bitmap 332 are searched for the particular series of events "visited the merchant's homepage, then navigated to the calendar collection, and then visited the webpage for the product Puppy Calendar".

In some embodiments, the method of FIG. 10 may include generating the information prior to performing the query. For example, the bitmap 332 of FIG. 8 may be generated prior to performing a query on the data. In some embodiments, the information is generated by performing operations including: searching each sequence of the plurality of sequences for the target event; and for each sequence of the plurality of sequences: recording whether or not the target event was found in the sequence.

In some embodiments, searching for the series of particular events in the subset of the sequences in substep 404C may include, for each sequence of the subset of the sequences: traversing the sequence event-by-event in time consecutive order of the events. The traversing may include first searching for a first event of the series of the events, and if the first event is found, then continuing the traversing searching next for a second event of the series of events.

In some embodiments, the method of FIG. 10 may further include: counting how many sequences of the subset of sequences includes the series of particular events, and/or counting how many sequences of the subset of the sequences includes a first event of the series of particular events and not a subsequent second event of the series of particular events.

In some embodiments, the target event in the method of FIG. 10 is the first event (i.e. "entry event") of the series of particular events.

In some embodiments, in the method of FIG. 10: the target event is a first target event; the series of particular events also includes a second target event; the information is a first bitmap that indicates, for each sequence of the plurality of sequences, whether or not the sequence includes the first target event; a second bitmap is obtained that indicates, for each sequence of the plurality of sequences, whether or not the sequence includes the second target event; the second bitmap is also used to identify the subset of the plurality of sequences; and each sequence of the subset of the plurality of sequences includes both the first target event and the second target event. For example the first bitmap may be bitmap 332 of FIG. 9 and the second bitmap may be bitmap 334 of FIG. 9, and both bitmaps are used (e.g. AND'd together on a bit-by-bit basis) to identify the subset of sequences that only include both the events "visited the merchant's homepage" and "navigated to the calendar collection".

In some embodiments, the method of FIG. 10 may further include: receiving x queries over time; identifying a candidate event that is present in each of at least y≤x of the x queries; and in response to the candidate event being present in each of at least y of the x queries: searching each sequence of the plurality of sequences for the candidate event and, for each sequence of the plurality of sequences, recording whether or not the candidate event was found in the sequence. For example, as explained earlier, an event may be identified as "common" if the number (y) of funnel queries including that event exceeds a predetermined threshold, in which case a bitmap may be generated for that event. In some embodiments, the candidate event is always a first event (i.e. "entry event") in each of the queries in which the candidate event is present.

In some embodiments, in the method of FIG. 10, for each sequence of the plurality of sequences, the respective set of events recorded by the sequence are stored consecutively in order of time. In some embodiments, the series of particular events are also consecutive in order of time. In some embodiments, each sequence of the plurality of sequences corresponds to a different user. In some embodiments, each event is recorded as one or more numerical values.

Funnel Queries Covering Multiple Time Periods

As explained earlier in relation to FIG. 5, the data storage system 262 may store multiple data partitions, each data partition covering a respective different time period and/or a respective different set of users. For example, FIG. 5 illustrates six different data partitions 264A-264F stored for a particular merchant. Three adjacent time periods are covered: time period A, time period B, and time period C. Each one of the data partitions 264A-264F stores a different set of sequences. The sequences in one data partition do not overlap with the sequences in any other data partition. For example, data partition 264A stores five different sequences, each one having a respective sequence ID and each one storing the events performed by a respective user during time period A. Data partition 264D stores two different sequences, each one also having a respective sequence ID and each one also storing the events performed by a respective user during time period A. However, the sequences in data partition 264A are different from the sequences in data partition 264D. In particular, in time period A there were seven unique users, each one performing a respective sequence of events. Five of the users have their sequences stored in data partition 264A, and the other two users have their sequence stored in data partition 264D. In general, a user may be mapped to different sequence IDs across different partitions. An example mapping between users and sequence IDs is illustrated in FIG. 5. For example, during time period A, user Dave performs the sequence of events stored as sequence ID #2 in data partition 264D. During time period B, user Dave performs the sequence of events stored as sequence ID #2 in data partition 264E. During time period C, user Dave performs the sequence of events stored as sequence ID #4 in data partition 264C. In general, a series of adjacent consecutive events performed by a single user may therefore be partitioned into a plurality of disjoint data partitions that are adjacent in time. For example, user Dave performs a progression of events that are partitioned into three disjoint data partitions: data partition 264D, which covers the events performed by Dave that fall within time period A; data partition 264E, which covers the events performed by Dave that fall within adjacent time period B; and data partition 264C, which covers the event performed by Dave that fall within adjacent time period C.

As explained earlier, by having multiple distinct and disjoint data partitions, e.g. data partitions 264A-F, then parallel processing may be more easily facilitated. For example, the funnel query engine 252 may perform, in parallel, both the funnel query on data partition 264A and the funnel query on data partition 264D, and then aggregate (e.g. sum) the results. Another possible benefit is also achieved, which will be explained as follows.

In some implementations the longer a sequence in a data partition, the longer it takes to traverse that sequence to search for a funnel or funnel event. Also, although each event in a sequence may be timestamped, the compact storage of the events in the sequence may be such that there is not a clear boundary between different partitions of time in the sequence. For example, it may not be possible to jump to the start of a particular day in the sequence and begin traversing the sequence at that point. Instead, in some implementations the sequence may need to be traversed from the beginning, i.e. beginning from the first event in the sequence. If a sequence in a single data partition stores the last 30 days of events for a user, but the funnel query only requires searching the last 2 days of events, then additional time may be incurred due to having to traverse a 30-day sequence for only 2-days' worth of events. This additional time incurred may impact the ability of the funnel query engine 252 to run the funnel query in real-time or near real-time. Therefore, in some embodiments, like in FIG. 5, multiple data partitions are stored that are disjoint in time. For example, in FIG. 5, data partition 264A covers time period A, data partition 264B covers adjacent time period B, and data partition 264C covers adjacent time period C. In general, a time period covered by a data partition may be relatively short, e.g. one day. Then, if a funnel query is to be performed that covers only a short period of time, the corresponding data partition(s) may be more quickly traversed compared to if a data partition had to be traversed that covered a long period of time.

In some embodiments, the time period covered by a data partition may be equal to the minimum amount of time required to be covered by a funnel query. For example, if the funnel query engine 252 requires a funnel query request from a device to minimally cover a period of time spanning at least one day, then time periods A, B, and C may each be one day in length, e.g. time period A may cover May 1, 2019, time period B may cover May 2, 2019, and time period C may cover May 3, 2019. In some embodiments, the time period covered by a data partition may be equal to the length of time regularly (or most often) covered by a funnel query. For example, if most funnel query requests received by the funnel query engine 252 cover a period of the last seven days (e.g. "In the last seven days, how many unique users performed X, then Y, then Z"), then time periods A, B, and C may each be seven days in length, e.g. time period A may cover May 5-11, 2019, time period B may cover May 12-18, 2019, and time period C may cover May 19-25, 2019.

If a funnel query is to be performed that covers a period of time spanning multiple data partitions, then mappings in memory may be used to track the funnel event each user is at in the funnel at the start of each time period corresponding to a data partition. An example will be explained below.

Figure 11:
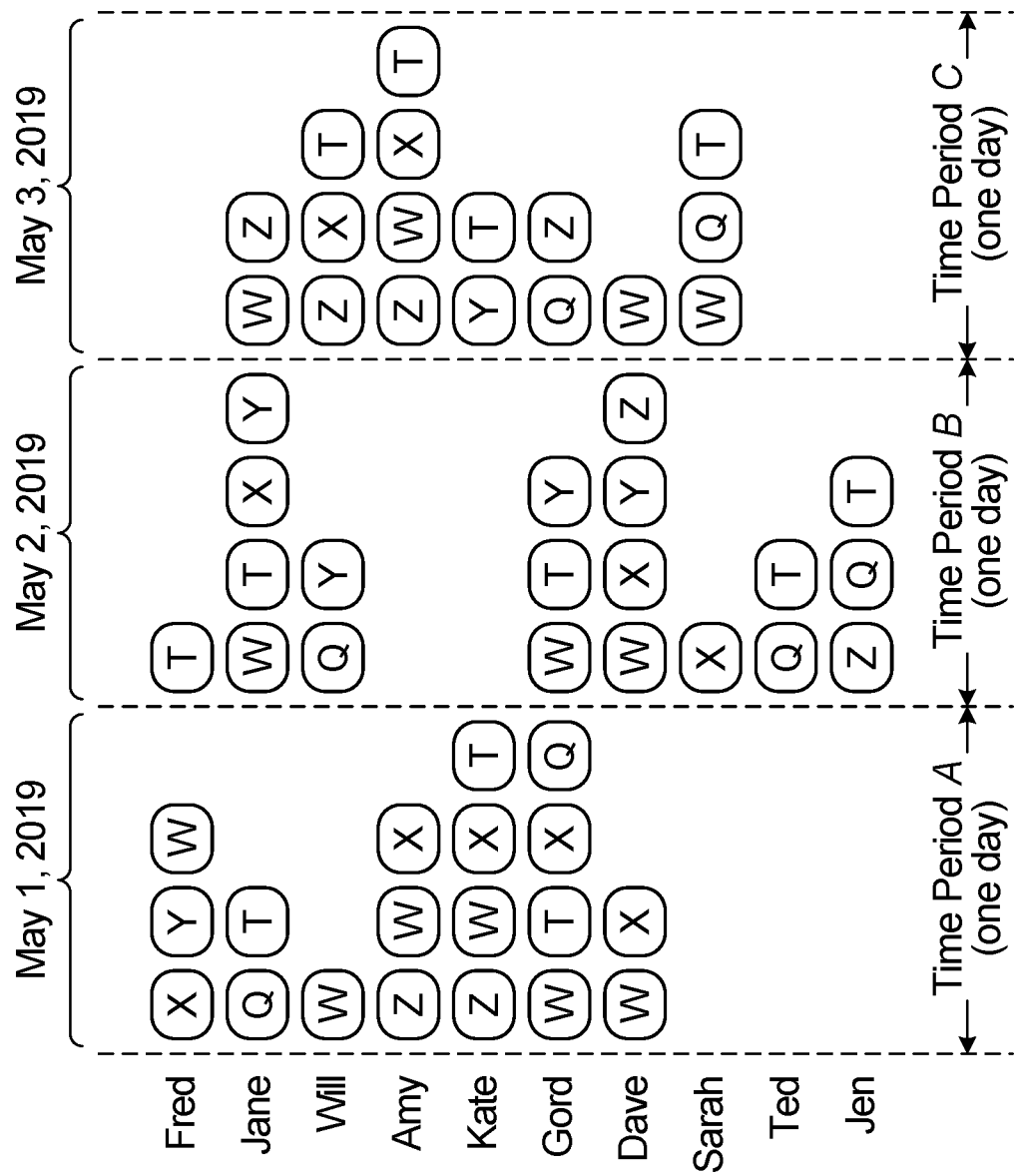
FIG. 11 illustrates a series of events performed by ten different users over three days, according to one embodiment.

FIG. 11 illustrates a series of events performed by ten different users over three days, according to one embodiment. For ease of explanation, an event is represented using a letter. For example, the letter X is one event (e.g. "user lands on Puppy Calendar product webpage"), the letter Y is another event (e.g. "user adds Puppy Calendar product to cart"), etc. The events are actually stored as a set of one or more numerical values, with each numerical value having a predefined mapping to understandable actions and information, e.g. as discussed earlier.

Different users perform different events over the course of the three day period. For example, user Fred performs a series of three consecutive events on May 1, 2019, followed by one event on May 2, 2019, and no events on May 3, 2019. As another example, user Jane performs two consecutive events on May 1, 2019, followed by four consecutive events on May 2, 2019, and followed by two consecutive events on May 3, 2019. The events illustrated in FIG. 11 are stored in a plurality of data partitions. In the following example, it will be assumed that the events illustrated in FIG. 11 are stored in data partitions 264A-F in the manner shown in FIG. 5. As explained earlier, look-up-table 305 in FIG. 6 stores mappings that identify the user that corresponds to each sequence ID in each of data partitions 264A-F of FIG. 5.

Figure 12:
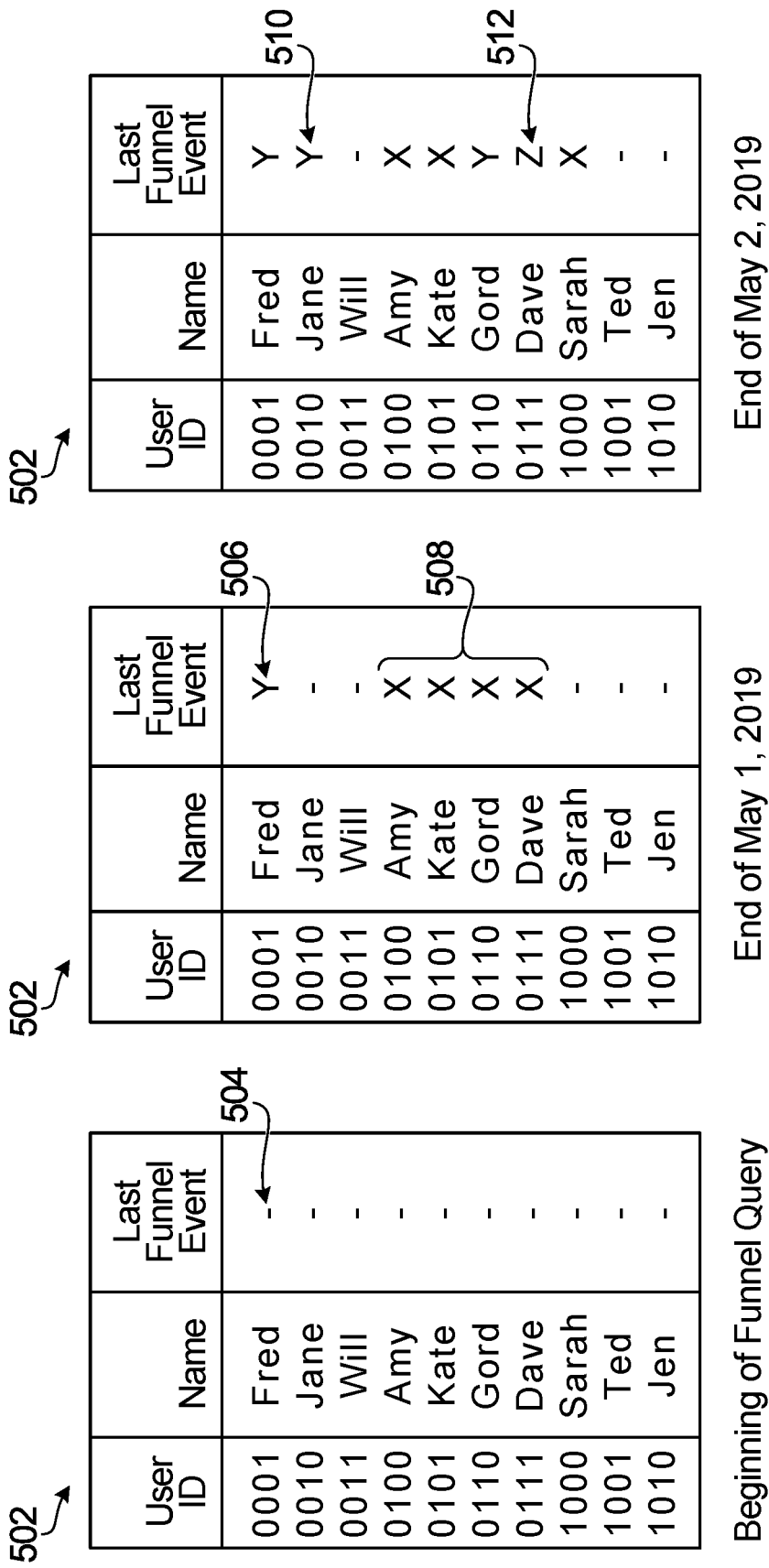
FIG. 12 illustrates a look-up-table that tracks the funnel event each user is at in the funnel at the start of each time period, according to one embodiment.

Assume that the following funnel query is to be performed: "During the time period of May 1-3, 2019, how many unique users performed event X, then event Y, and then event Z". The funnel query covers a period of time that spans multiple data partitions, and so memory is used to track the funnel event each user is at in the funnel at the start of each time period corresponding to a data partition. FIG. 12 illustrates the mappings in the form of a look-up-table (LUT) 502 that tracks the funnel event each user is at in the funnel at the start of each time period, according to one embodiment. The LUT 502 is shown at three different points in time in FIG. 12: the beginning of the funnel query, the end of May 1, 2019, and the end of May 2, 2019. The LUT 502 may be stored in memory of the data storage system 262 and/or in memory 256 of the funnel query engine 252. In some embodiments, the user ID may be hashed. In FIG. 12, a single LUT 502 is shown that tracks the funnel event for each user. In an alternative implementation, there may instead be multiple LUTs, each LUT corresponding to a respective different subset of the users. For example, in some implementations a user may be confined to the same horizontal row of partitions, e.g. as explained earlier in relation to FIG. 5, in which case LUT 502 may instead be implemented as multiple LUTs: one for each horizontal row of partitions (e.g. one LUT for the users in partitions 264A, 264B, and 264C of FIG. 5, and another LUT for the users in partitions 264D, 264E, and 264F of FIG. 5).

At the beginning of the funnel query, the funnel query engine 252 determines that performing the funnel query requires sequentially traversing multiple data partitions because the funnel query covers a period of time that spans multiple data partitions. The funnel query engine 252 therefore generates the LUT 502, so that it can be used to record the mapping between each user and the funnel event each user is at in the funnel at the start of each time period corresponding to a data partition. Initially, none of the data partitions 264A-F have been searched yet for the funnel, and so the LUT 502 is initialized at the beginning to indicate, for each user, that no funnel event has been found yet for that user. This indication is shown by the presence of a dash, e.g. dash 504 in FIG. 5. Note that in an alternative embodiment, the LUT 502 need not be initialized with empty values for every possible user, but instead a user may be dynamically added to the LUT 502 only if the user is determined to have performed the first event in the funnel. This may avoid wasting memory on users not even involved in the funnel result. In this alternative embodiment, each dash in FIG. 12 may instead be a non-existing entry in the LUT 502.

The funnel query engine 252 first traverses the sequences that correspond to the first time period (May 1, 2019) to begin searching for the funnel for each user. Specifically, data partitions 264A and 264D are first searched because these data partitions correspond to the first time period May 1, 2019. Data partitions 264A and 264D may be searched in parallel. Searching data partitions 264A and 264D reveals some of the funnel events for some of the users. For example, for user Fred, the funnel events X and Y are found on May 1, 2019, which means that only the funnel event Z needs to now be found for Fred on May 2-3, 2019. At the end of the first time period (i.e. at the end of May 1, 2019), the LUT 502 is updated to indicate that the most recent funnel event found for user Fred is Y, as shown at 506 in FIG. 12. Searching data partitions 264A and 264D also reveals that funnel event X was found for users Amy, Kate, Gord, and Dave, and so this is also stored in LUT 502, as shown at 508 in FIG. 12.

The funnel query engine 252 next traverses the sequences that correspond to the second time period (May 2, 2019) to continue searching for the funnel for each user. Specifically, data partitions 264B and 264E are next searched because these data partitions correspond to the second time period May 2, 2019. Data partitions 264B and 264E may be searched in parallel. For each sequence in data partition 264B and 264E, the following steps are performed by the funnel query engine 252: (1) the user corresponding to the sequence ID is determined, e.g. using the mapping in FIG. 6; (2) the LUT 502 of FIG. 12 is consulted to determine the most recent funnel event in the funnel found for that user; and (3) then the sequence is traversed beginning at the start of the sequence, and starting by looking for the next event in the funnel that needs to be found for the user. For example, sequence #1 in data partition 264B corresponds to user Fred, and according to the LUT 502 the most recent funnel event found for user Fred was event Y. Sequence #1 of data partition 264B is therefore traversed to search for next funnel event Z. As another example, sequence #2 in data partition 264E corresponds to user Dave, and according to the LUT 502 the most recent funnel event found for user Dave was event X. Sequence #2 of data partition 264E is therefore traversed to search for next funnel event Y. If TrailDB™ is used to implement the data partitions 264A-F, then traversing each sequence (i.e. trail) may be performed using an EventFilter having a batch size set to one. The EventFilter is initially set to search for the appropriate funnel event based on the LUT 502. If the funnel event is found, then traversing the trail continues with the EventFilter updated to look for the next funnel event, and so on.

Searching data partitions 264B and 264E reveals some more funnel events for some of the users. For example, for user Jane the funnel events X and Y are found on May 2, 2019, which means that only the funnel event Z needs to now be found for Jane on May 3, 2019. At the end of the second time period (i.e. at the end of May 2, 2019), the LUT 502 is updated to indicate that the most recent funnel event found for user Jane is Y, as shown at 510 in FIG. 12. As another example, for user Dave the remaining funnel events Y and Z are found on May 3, 2019. The funnel is therefore present and has been found for Dave. Any sequence corresponding to events performed by Dave on May 3, 2019, does not need to be searched. The LUT 502 is updated to indicate that the funnel has been found for user Dave, e.g. as shown at 512 in FIG. 12. FIG. 12 shows the state of the LUT 502 at the end of May 2, 2019.

The funnel query engine 252 next traverses the sequences that correspond to the third time period (May 3, 2019) to continue searching for the funnel for each user. Specifically, data partitions 264C and 264F are next searched because these data partitions correspond to the third time period May 3, 2019. Data partitions 264C and 264F may be searched in parallel. For each sequence in data partition 264C and 264F, the following steps are performed by the funnel query engine 252: (1) the user corresponding to the sequence ID is determined, e.g. using the mapping in FIG. 6; (2) the LUT 502 of FIG. 12 is consulted to determine the most recent funnel event in the funnel found for that user; and (3) then the sequence is traversed beginning at the start of the sequence, and starting by looking for the next event in the funnel that needs to be found for the user. If the funnel has already been found for a user, then the sequence for that user does not need to be searched. For example, sequence #4 in data partition 264C corresponds to user Dave, and LUT 502 indicates at 512 that the funnel has already been found for user Dave, and therefore sequence #4 in data partition 264C does not need to be searched.

In some implementations, a data partition may be referred to as a "time shard", and performing a funnel query over multiple data partitions, each covering a different time period, may be referred to as "stitching together" the time shards.

By storing events across multiple discrete data partitions, each covering a relatively short time period, a possible benefit is achieved in that it may be faster to perform a funnel query that spans a short period of time. Moreover, to accommodate funnel queries that do not span a short period of time, memory such as LUT 502 may be used to track the funnel event each user is at in the funnel at the start of each time period corresponding to a data partition. However, using the LUT 502 has a cost associated with it: the LUT 502 must be generated, updated at the end of a time period, and consulted at the start of the next time period. If a funnel query is performed that spans many time periods, then the speed of the funnel query may be negatively impacted by having to access the LUT 502 multiple times. Therefore, in some embodiments, data partitions covering different time durations are stored, e.g. both data partitions that cover a shorter period of time and data partitions that cover a longer period of time. When a funnel query is to be performed that covers a particular duration of time, the funnel query is performed on the fewest number of data partitions possible.

As one example, every day three data partitions may be created and stored: (i) one covering the events of that day; (ii) another one that is a merge of the data partitions of the previous seven days; and (iii) another one that is a merge of the data partitions of the previous 30 days. Then, when a funnel query is received covering a particular number of days, the funnel query is performed on the fewest number of data partitions possible. For example, if the funnel query covers the previous 30 days, then the 30-day data partition is used. As another example, if the funnel query covers the previous 9 days, then three data partitions are used: the one storing the events of the previous 7 days, the one storing the events of 8 days ago, and the one storing the events of 9 days ago.

Note that the bitmap filtering described earlier, e.g., in relation to FIGS. 8-10, may be combined with any of the embodiments described above. For example, a bitmap corresponding to entry event X may be used to eliminate any users that do not include event X, e.g. users Ted and Jen in FIG. 11. The LUT 502 would therefore not need to include Ted and Jen, and any sequences corresponding to Ted or Jen would not need to be searched.

Figure 13:
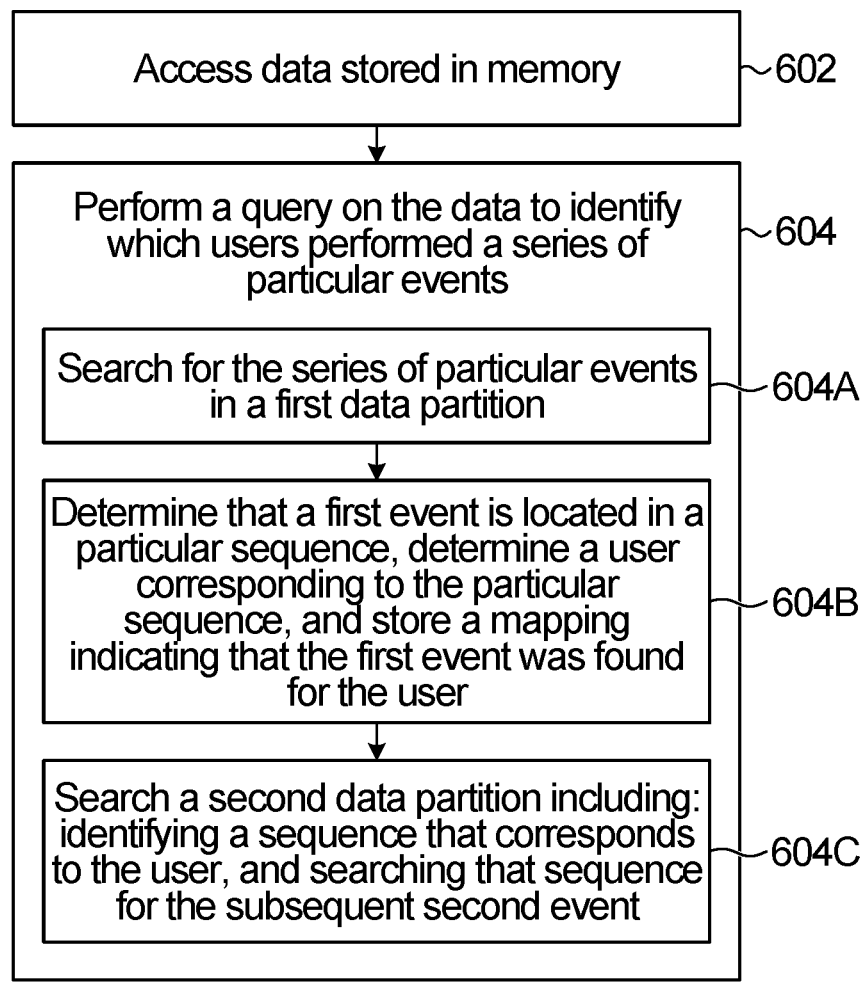
FIG. 13 illustrates a computer-implemented method, according to another embodiment.

FIG. 13 illustrates a computer-implemented method, according to one embodiment. The method may be performed by a computing device, e.g. a processor such as processor 254 of funnel query engine 252.

At step 602, the processor accesses data stored in memory. The data is stored in a plurality of data partitions in the memory. Each data partition of the plurality of data partitions includes a respective set of sequences. Each sequence of the respective set of sequences corresponds to a respective user, and each sequence of the respective set of sequences records a respective set of events that were performed by the respective user. An example is data partitions 264A-F of FIG. 5.

At step 604, the processor performs a query on the data to identify which ones of a plurality of users performed a series of particular events. The query may be a funnel query. The series of particular events are defined by the query, and the series of particular events include a first event and a subsequent second event. For example, the series of particular events may be: "X, then Y, and then Z", in which case there are three events in the series of particular events (the event "X", the event "Y", and the event "Z"). The first event may be the entry event, i.e. "X", and the subsequent second event may be the next event "Y".

Step 604 may include the following substeps, which are operations performed as part of the query.

At substep 604A, the processor searches for the series of particular events in each of at least some of the sequences in a first data partition. For example, the processor may search each of the sequences in data partition 264D for the particular series of events "X, then Y, then Z".

At substep 604B, in response to determining that the first event is located in a particular sequence in the first data partition: determining a particular user corresponding to the particular sequence, and storing a mapping indicating that the first event was found for the particular user. For example, if the first event is the entry event "X", then entry event "X" is found for sequence #1 in data partition 264D of FIG. 5. Sequence #1 in data partition 264D corresponds to user Gord (as per table 305 of FIG. 6), and so table 502 of FIG. 12 is updated to indicate the mapping that event X was found for Gord (see 508 of FIG. 12).

At substep 604C, the processor searches at least some of the sequences in a second data partition, including: identifying that a given sequence in the second data partition corresponds to the particular user, accessing the mapping to determine that the first event was already found for the particular user, and beginning searching the given sequence in the second data partition for the subsequent second event. In some embodiments, the given sequence is not searched for the first event. For example, the second data partition may be data partition 264E. The sequences in data partition 264E are searched. A given sequence (sequence #1 in this example) in data partition 264E corresponds to user Gord. The mapping in table 502 of FIG. 12 indicates that first event "X" was already found for user Gord. Therefore, sequence #1 in data partition 264E is searched for subsequence second event "Y". Sequence #1 in data partition 264E is not searched for the first event "X" because the first event has already been found for user Gord.

In some embodiments, the mapping is one of a plurality of mappings, and the plurality of mappings collectively indicate which one or more of the particular events, if any, have been found for each user of the plurality of users. An example is table 502 in FIG. 12. Each row of table 502 is one mapping.

In some embodiments, the plurality of mappings is in the form of a table that stores, for each user of the plurality of users, one of the following: (1) an indication that none of the particular events has been found for the user or (2) an indication that all of the particular events have been found for the user or (3) an indication of a most recent event that is one of the particular events and that has been found for the user. For example, reference character 504 of FIG. 12 shows an indication that none of the particular events has been found for user Fred, reference character 512 of FIG. 12 shows an indication that all of the particular events have been found for user Dave, and reference character 506 of FIG. 12 shows an indication of a most recent event ("Y") that is one of the particular events and that has been found for user Fred.

In some embodiments, the method further includes: determining from the table that all of the particular events have been found for a given user that is different from the particular user; and in response not searching the sequence in the second data partition that corresponds to the given user. For example, reference character 512 of FIG. 12 indicates that all of the events in the funnel have been found for user Dave, and so any subsequent sequence corresponding to user Dave in a subsequent data partition is not searched because the funnel has already been found for user Dave.

In some embodiments, the method of FIG. 13 further includes storing information indicating the respective user corresponding to each sequence in the first data partition and the respective user corresponding to each sequence in the second data partition, and the information is used to identify that the given sequence in the second data partition corresponds to the particular user. An example of such information is table 305 of FIG. 6, which can be used to identify that a given sequence in a given data partition corresponds to a particular user. In some embodiments, a sequence ID of the particular sequence in the first data partition is different from the sequence ID of the given sequence in the second data partition (e.g. user Dave corresponds to sequence #2 in data partition 264E and user Dave corresponds to sequence #4 in data partition 264C).

In some embodiments, searching for the series of particular events in each of at least some of the sequences in the first data partition includes, for each sequence of the at least some of the sequences in the first data partition: traversing the sequence event-by-event in time consecutive order of the events, the traversing including searching for the first event, and if the first event is found, then continuing the traversing searching next for the subsequent second event.

In some embodiments, the first data partition covers a first period of time, and the second data partition covers a second period. The second period of time may be non-overlapping with the first period of time. The second period of time may begin later than the first period of time. The second period of time may begin adjacent to the first period of time. For example, the period of time B covered by data partition 264E is non-overlapping, later than, and adjacent to the period of time A covered by data partition 264D. In some embodiments, the first period of time and the second period of time may have different time durations (e.g. period of time B may be a different duration compared to period of time A).

In some embodiments, a third data partition may be generated by merging the first data partition and the second data partition, and a subsequent query may be performed in which the third data partition is searched instead of the first data partition or the second data partition. For example, the first data partition and the second data partition may each cover one day. These two data partitions may be merged along with other data partitions to cover a period of seven consecutive days. A subsequent funnel query may then be performed on the new data partition.

In some embodiments, performing the query in FIG. 13 may include: obtaining information that indicates, for each sequence in the first data partition, whether or not the sequence includes the first event; and avoiding searching for the series of particular events in each sequence in the first data partition for which the information indicates that the sequence does not include the first event. An example of such information is bitmap 332 in FIG. 8. More generally, the method of FIG. 13 may be combined with any of the bitmap filtering embodiments described herein.

In some embodiments, for each sequence of the respective set of sequences, the respective set of events recorded by the sequence are stored consecutively in order of time. In some embodiments, the series of particular events are also consecutive in order of time. In some embodiments, each event is recorded as one or more numerical values.

Merchant User Experience

By implementing the bitmap filtering described above, e.g. in relation to FIGS. 7 to 10, and/or by implementing disjoint data partitions covering multiple time periods with the LUT described above, e.g. in relation to FIGS. 11 to 13, then it may be possible to perform funnel queries in real-time or near real-time. In an e-commerce application, in some embodiments the merchant may have the ability to run custom funnel queries with results returned in real-time or near real-time.

Figure 14:
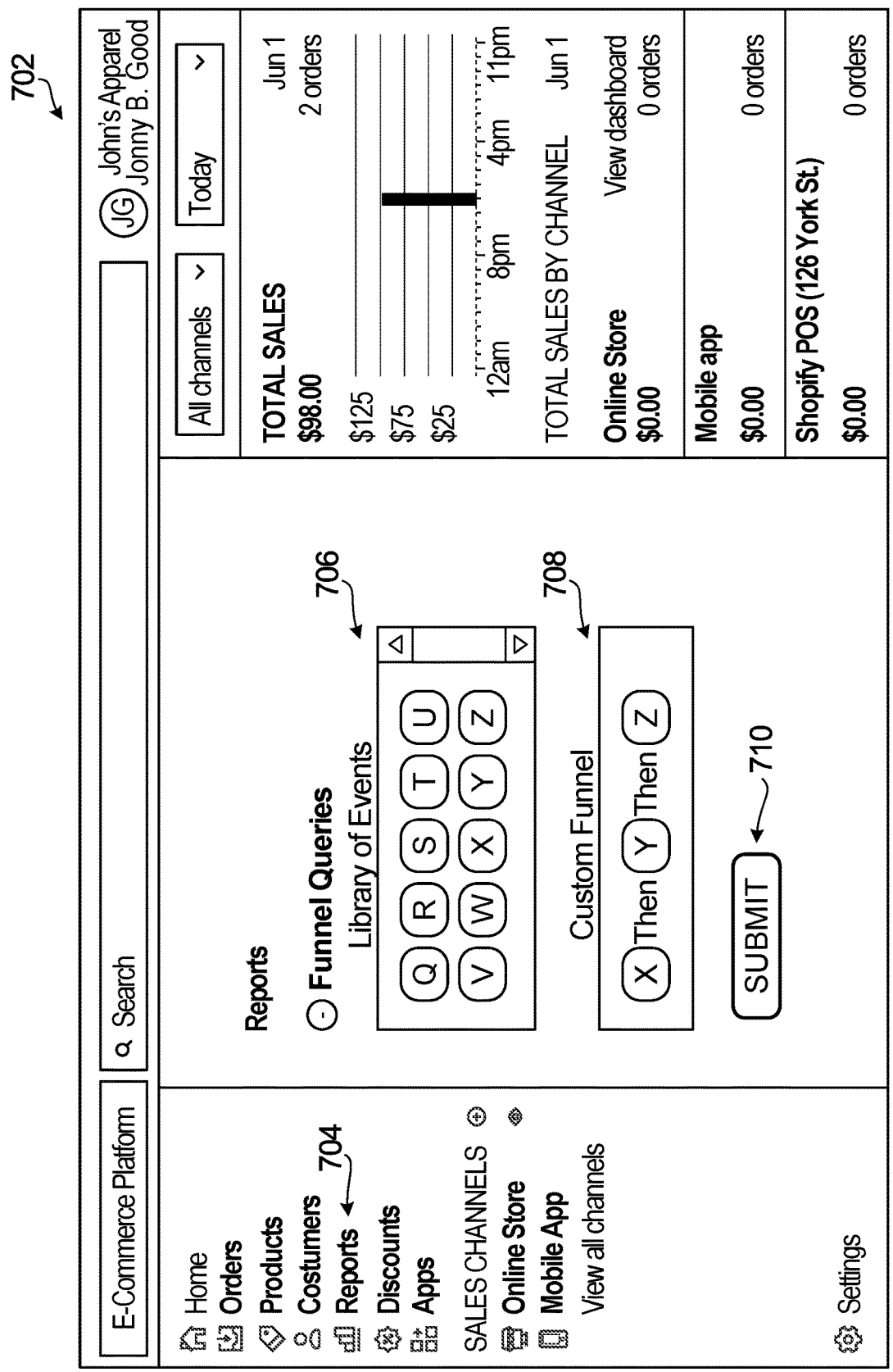
FIGS. 14 and 15 illustrate a user interface of a merchant device, according to one embodiment.

FIG. 14 illustrates a user interface 702 of a merchant device, according to one embodiment. When the "Reports" tab 704 is selected, an interface displays that allows for the merchant to generate a custom funnel. The interface includes a library of possible events 706, from which events can be dragged and dropped into a box 708 in any order to create a custom funnel query of interest to the merchant. The library of possible events 706 may be pre-defined and fixed, or possibly also custom created by the merchant. Once the custom funnel request is created, it may be transmitted to the funnel query engine 252 by the merchant selecting the submit button 710. The results of the funnel query are then returned to the merchant, e.g. as shown at 712 in FIG. 15.

Figure 15:
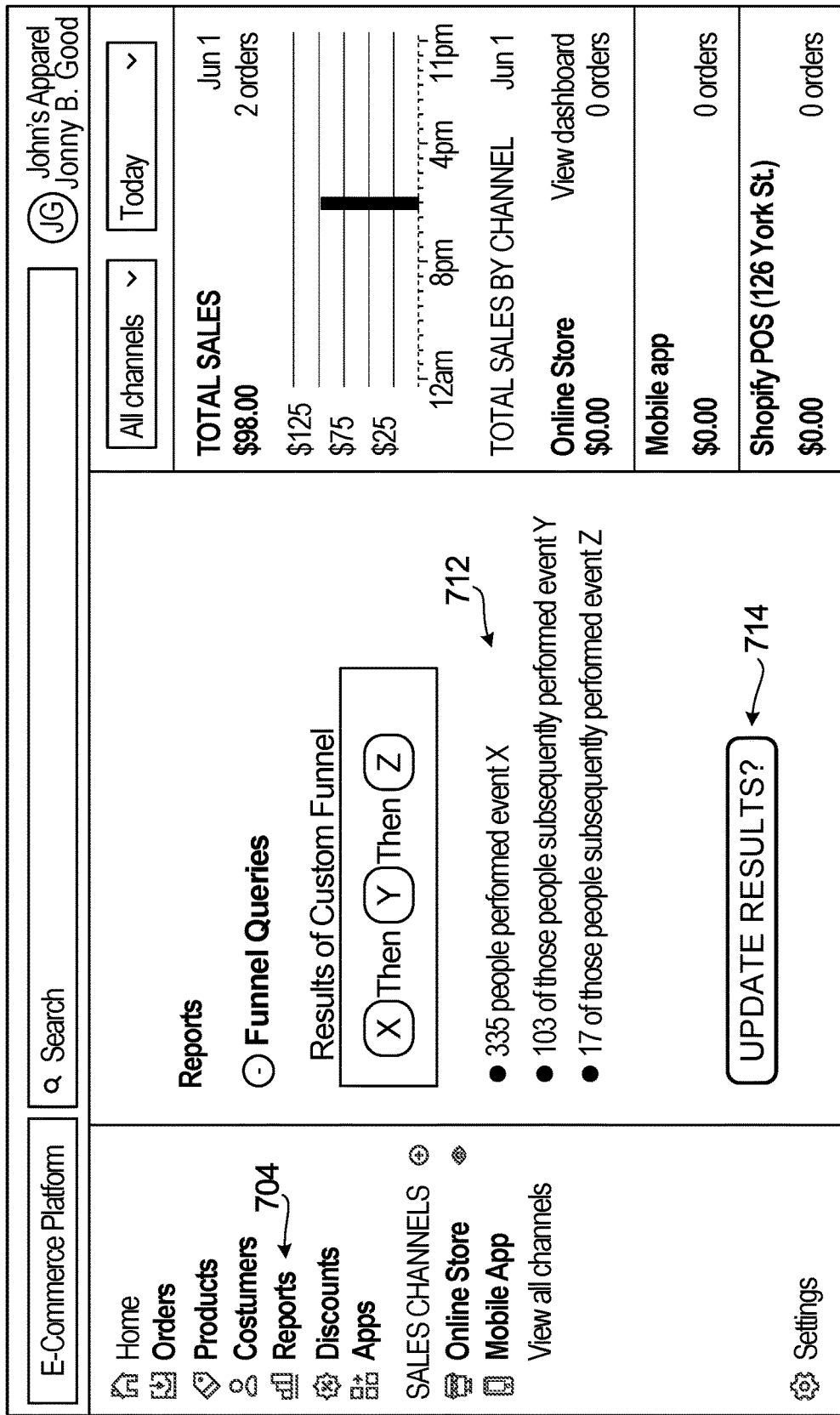

In some embodiments, a funnel query may be automatically re-executed on a periodic basis to refresh the results of the query for the merchant, or the results may be refreshed at the request of the merchant, e.g. by the merchant selecting button 714 of FIG. 15.

Conclusion

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A computer-implemented method comprising:
accessing data stored in memory, the data stored as a plurality of sequences, wherein each sequence of the plurality of sequences corresponds to a respective user, and each sequence of the plurality of sequences records a respective set of events that were performed by the respective user;

prior to receiving, from a computing device, a request to perform a query on the data: searching each sequence of the plurality of sequences for a target event to obtain information that indicates, for each sequence of the plurality of sequences, whether or not the sequence includes the target event;

subsequently receiving, from the computing device, the request to perform the query on the data, the query involving identifying which users performed a series of particular events, the series of particular events being defined by the query, and the series of particular events including the target event;

in response to the series of particular events including the target event, using the information to eliminate sequences that do not include the target event to result in a subset of the plurality of sequences; and performing the query on the subset of the plurality of sequences, wherein performing the query includes:

searching for the series of particular events in each sequence of the subset of the plurality of sequences.

2. The computer-implemented method of claim 1, wherein searching for the series of particular events in the subset of the sequences includes, for each sequence of the subset of the sequences:

traversing the sequence event-by-event in time consecutive order of the events, the traversing including first searching for a first event of the series of the events, and if the first event is found, then continuing the traversing searching next for a second event of the series of events.

3. The computer-implemented method of claim 1, further comprising:

counting how many sequences of the subset of sequences includes the series of particular events; and counting how many sequences of the subset of the sequences includes a first event of the series of particular events and not a subsequent second event of the series of particular events.

4. The computer-implemented method of claim 1, wherein the target event is a first event of the series of particular events.

5. The computer-implemented method of claim 1, wherein the target event is a first target event, wherein the series of particular events also includes a second target event, wherein the information is a first bitmap that indicates, for each sequence of the plurality of sequences, whether or not the sequence includes the first target event, wherein a second bitmap is obtained that indicates, for each sequence of the plurality of sequences, whether or not the sequence includes the second target event, wherein the second bitmap is also used to identify the subset of the plurality of sequences, and wherein each sequence of the subset of the plurality of sequences includes both the first target event and the second target event.

6. The computer-implemented method of claim 1, further comprising:

receiving x queries over time;

identifying a candidate event that is present in each of at least y≤x of the x queries; and in response to the candidate event being present in each of at least y of the x queries: searching each sequence of the plurality of sequences for the candidate event and, for each sequence of the plurality of sequences, recording whether or not the candidate event was found in the sequence.

7. The computer-implemented method of claim 6, wherein the candidate event is always a first event in each of the queries in which the candidate event is present.

8. The computer-implemented method of claim 1, wherein for each sequence of the plurality of sequences, the respective set of events recorded by the sequence are stored consecutively in order of time, and the series of particular events are also consecutive in order of time.

9. The computer-implemented method of claim 8, wherein each sequence of the plurality of sequences corresponds to a different user, and wherein each event is recorded as one or more numerical values.

10. A system comprising:

a memory to store data, the data stored as a plurality of sequences, wherein each sequence of the plurality of sequences corresponds to a respective user, and each sequence of the plurality of sequences records a respective set of events that were performed by the respective user;

a processor to perform operations including:

prior to receiving, from a computing device, a request to perform a query on the data: searching each sequence of the plurality of sequences for a target event to obtain information that indicates, for each sequence of the plurality of sequences, whether or not the sequence includes the target event;

subsequently receiving, from the computing device, the request to perform the query on the data, the query involving identifying which users performed a series of particular events, the series of particular events being defined by the query, and the series of particular events including the target event;

in response to the series of particular events including the target event, using the information to eliminate sequences that do not include the target event to result in a subset of the plurality of sequences; and performing the query on the subset of the plurality of sequences, wherein the processor is to perform the query by performing operations including:

searching for the series of particular events in each sequence of the subset of the plurality of sequences.

11. The system of claim 10, wherein searching for the series of particular events in the subset of the sequences includes, for each sequence of the subset of the sequences:

traversing the sequence event-by-event in time consecutive order of the events, the traversing including first searching for a first event of the series of the events, and if the first event is found, then continuing the traversing searching next for a second event of the series of events.

12. The system of claim 10, wherein the processor is further to:

count how many sequences of the subset of sequences includes the series of particular events; and count how many sequences of the subset of the sequences includes a first event of the series of particular events and not a subsequent second event of the series of particular events.

13. The system of claim 10, wherein the target event is a first event of the series of particular events.

14. The system of claim 10, wherein the target event is a first target event, wherein the series of particular events also includes a second target event, wherein the information is a first bitmap that indicates, for each sequence of the plurality of sequences, whether or not the sequence includes the first target event, wherein the processor is to obtain a second bitmap that indicates, for each sequence of the plurality of sequences, whether or not the sequence includes the second target event, wherein the second bitmap is also used to identify the subset of the plurality of sequences, and wherein each sequence of the subset of the plurality of sequences includes both the first target event and the second target event.

15. The system of claim 10, wherein the processor is further to:
receive x queries over time;
identify a candidate event that is present in each of at least y≤x of the x queries; and
in response to the candidate event being present in each of at least y of the x queries: search each sequence of the plurality of sequences for the candidate event and, for each sequence of the plurality of sequences, record whether or not the candidate event was found in the sequence.

16. The system of claim 15, wherein the candidate event is always a first event in each of the queries in which the candidate event is present.

17. The system of claim 10, wherein for each sequence of the plurality of sequences, the respective set of events recorded by the sequence are stored consecutively in order of time, and the series of particular events are also consecutive in order of time.

18. The system of claim 17, wherein each sequence of the plurality of sequences corresponds to a different user, and wherein each event is recorded as one or more numerical values.

19. The computer-implemented method of claim 1, wherein the information comprises a plurality of bit values, each bit value corresponding to a respective sequence of the plurality of sequences, and each bit value indicating whether or not the corresponding respective sequence includes the target event.

20. The system of claim 10, wherein the information comprises a plurality of bit values, each bit value corresponding to a respective sequence of the plurality of sequences, and each bit value indicating whether or not the corresponding respective sequence includes the target event.

* * * * *